(12) United States Patent
Whitson et al.

(10) Patent No.: US 12,428,702 B2
(45) Date of Patent: Sep. 30, 2025

(54) SYSTEMS AND METHODS FOR THE ENHANCEMENT OF MIDSTREAM-LIQUID RESOURCES FOR DIRECT METAL EXTRACTION

(71) Applicant: Lithos Industries Inc., Fort Worth, TX (US)

(72) Inventors: Hood H. Whitson, Fort Worth, TX (US); William L. Bourcier, Livermore, CA (US); Sarah Hause, Fort Worth, TX (US); Wesley Paul Kowalczuk, Johnson City, TN (US)

(73) Assignee: Lithos Industries Inc., Fort Worth, TX (US)

( * ) Notice: Subject to any disclaimer, the term of this patent is extended or adjusted under 35 U.S.C. 154(b) by 0 days.

(21) Appl. No.: 18/807,893

(22) Filed: Aug. 16, 2024

(65) Prior Publication Data

US 2025/0043385 A1 Feb. 6, 2025

Related U.S. Application Data

(63) Continuation-in-part of application No. 18/601,898, filed on Mar. 11, 2024, and a continuation-in-part of
(Continued)

(51) Int. Cl.
*C22B 3/42* (2006.01)
*B01D 15/08* (2006.01)
(Continued)

(52) U.S. Cl.
CPC ............... *C22B 3/42* (2013.01); *B01D 15/08* (2013.01); *B01D 61/025* (2013.01); *B01D 61/04* (2013.01); *C22B 26/12* (2013.01); *B01D 2311/04* (2013.01)

(58) Field of Classification Search
USPC ........................................................ 75/711
See application file for complete search history.

(56) References Cited

U.S. PATENT DOCUMENTS

| 2010/0204068 A1* | 8/2010 | Kesavan | C09K 8/88 |
| | | | 507/225 |
| 2020/0299805 A1 | 9/2020 | Mceachern et al. | |
| 2021/0284555 A1 | 9/2021 | Pavia et al. | |

FOREIGN PATENT DOCUMENTS

| CN | 110392670 A | * 10/2019 | ............. C02F 1/463 |
| WO | 2022129973 A1 | 6/2022 | |
| WO | WO-2023215411 A1 | * 11/2023 | ........... B01D 1/2856 |

OTHER PUBLICATIONS

Gu, et al.,: "Feasible Regeneration of Cathode Material From Spent Portable Electronics Batteries via Nano-Bubbles Enhanced Leaching", Journal of Cleaner Production, Elsevier, Amsterdam, vol. 368, XP087165587, Jul. 20, 2022, 11 pgs.
(Continued)

*Primary Examiner* — Colin W. Slifka
(74) *Attorney, Agent, or Firm* — Bryan A. Santarelli; FisherBroyles, LLP

(57) ABSTRACT

Embodiments of the present disclosure may include a system and method for enhancing the extraction of lithium from a liquid resource. A volume of midstream-liquid resource may be received from a site like a pipeline, tank, or disposal site where the midstream-liquid resource may undergo a pre-treatment. A treatment regimen may be applied to remove hydrocarbons, organic matter, hydrogen sulfide, ions, and suspended solids along with reduction of excess pre-treatment chemicals and byproducts. Embodiments may further include critical-material extraction. The system for this process includes a pre-treatment station, a filtration station, and a direct-lithium-extraction (DLE) unit, with a reverse-osmosis station to concentrate the lithium product.

12 Claims, 5 Drawing Sheets

Related U.S. Application Data application No. PCT/US2024/019454, filed on Mar. 11, 2024.

(60) Provisional application No. 63/489,639, filed on Mar. 10, 2023.

(51) Int. Cl.
*B01D 61/02* (2006.01)
*B01D 61/04* (2006.01)
*C22B 26/12* (2006.01)

(56) References Cited

OTHER PUBLICATIONS

International Search Report & Written Opinion mailed Sep. 20, 2024, from the European Patent Office, for Application No. PCT/US2024/019454, a counterpart application of U.S. Appl. No. 18/601,898, 20 pgs.

\* cited by examiner

SYSTEMS AND METHODS FOR THE ENHANCEMENT OF MIDSTREAM-LIQUID RESOURCES FOR DIRECT METAL EXTRACTION

CROSS-REFERENCE TO RELATED APPLICATION

The present Continuation-In-Part Utility Patent Application claims priority to U.S. Non-Provisional Utility patent application Ser. No. 18/601,898, filed on Mar. 11, 2024, and entitled "SORBENT COMPOSITIONS WITH NANOBUBBLES IN PRODUCED WATER APPLICATIONS," and claims priority to International Patent Application No. PCT/US24/19454, filed on Mar. 11, 2024, and entitled "SORBENT COMPOSITIONS WITH NANOBUBBLES IN PRODUCED WATER APPLICATIONS," both of which applications (and the present Continuation-In-Part Utility Patent Application) claim priority to U.S. Provisional Utility Patent Application No. 63/489,639, filed on Mar. 10, 2023, and entitled "USE OF SORBENT COMPOSITIONS WITH NANOBUBBLES IN PRODUCED WATER APPLICATIONS." The disclosures of the prior Related Applications are considered part of and are incorporated by reference into the present Patent Application.

TECHNICAL FIELD

The subject matter herein relates, generally, to the pre-treatment and treatment regimens of a midstream liquid resource. Exemplary treatment regimens remove known impurities as well as chemicals associated with pre-treatment and their byproducts, thus removing impurities to improve or enhance, or even to optimize, the extraction of a metal from a metal-containing fluid.

SUMMARY

Embodiments disclosed herein relate to methods and systems for enhancing or optimizing the extraction of lithium from midstream liquid resources. Embodiments addresses the need for effective pre-treatment and treatment processes to ensure the efficient removal of impurities and enhance lithium extraction.

Embodiments of the present disclosure provide methods for enhancing or optimizing the extraction of lithium from a midstream liquid resource. In one embodiment, a volume of a midstream liquid resource is received from a pipeline, tank, or disposal site. The midstream liquid resource undergoes pre-treatment, which includes applying a biocide to the volume of the midstream liquid resource. The treatment regimen applied to the pre-treated fluid involves removing hydrocarbons, organic matter, hydrogen sulfide, ions, or suspended solids, and performing critical-material extraction.

In some embodiments, the biocide applied to the midstream liquid resource comprises at least one of an oxidizer, glutaraldehyde, Quaternary Ammonium Compounds (QUATs), DBNPA (2,2-Dibromo-3-nitrilopropionamide), or THPS. (Tetrakis(hydroxymethyl)phosphonium sulfate). Further embodiments include applying an oxidizer such as hydrogen peroxide, ozone, bubbled oxygen, nanobubbled oxygen, carbon dioxide ($CO_2$), aeration, chlorine, chlorine dioxide, sodium hypochlorite, peracetic acid, potassium permanganate, or calcium hypochlorite to the midstream liquid resource.

In another embodiment, the treatment regimen to the pre-treated fluid comprises applying at least one of media filtration, cartridge filters, bag filters, disc filters, membrane filtration, activated carbon, dissolved air flotation (DAF), suspended air flotation (SAF), or a weir tank. Removing hydrocarbons, organic matter, ions, or suspended solids may involve applying at least one of a polyacrylamide (PAM), polyethyleneimine, polyamines, polyDADMAC (polydiallyldimethylammonium chloride), starch-based flocculants, chitosan, or other organic or inorganic flocculants. Precipitated, emulsified, or flocculated solids are removed using media filtration, cartridge filters, bag filters, disc filters, membrane filtration, activated carbon, DAF, SAF, a weir tank, or a settling tank.

In further embodiments, pre-treating a volume of a midstream liquid resource includes separating the resource into a retentate and a filtrate. The filtrate has a turbidity of less than 20 Nephelometric Turbidity Units (NTU), Total Suspended Solids (TSS) of less than 200 milligrams/Liter (mg/L), a positive Oxidation-Reduction Potential (ORP), and an iron content of less than 5 mg/L. Additionally, pre-treating may involve altering the cationic or anionic constituency using a media bed, ion-exchange process, or ceramic/polymeric membrane filtration. Pretreating also may include creating a retentate through a desalination process, and concentrating the resource to a higher level of Total Dissolved Solids (TDS) using a membrane or thermal evaporation.

In another embodiment, applying a treatment regimen to a liquid resource comprises using at least one biocide, including hydrogen peroxide, ozone, bubbled oxygen, nanobubbled oxygen, $CO_2$, aeration, chlorine, chlorine dioxide, sodium hypochlorite, peracetic acid, potassium permanganate, calcium hypochlorite, glutaraldehyde, QUATs, DBNPA, or THPS. The treatment regimen may also include a flocculant such as polyacrylamide, polyethyleneimine, PAM, polyamines, polyDADMAC, starch-based flocculants, or chitosan; a coagulant such as polyaluminum chloride, aluminochlorohydrate, PAC, aluminum sulfate, ferric chloride, ferric sulfate, ferrous sulfate, sodium aluminate, or calcium hydroxide; and a surfactant like polyethylene glycols, alcohol ethoxylates, linear alkyl ethoxylates, sodium dodecyl sulfate, sodium lauryl sulfate, octylphenol ethoxylates, nonylphenol ethoxylates, alkyl polyglycosides, cocamidopropyl betaine, saponins, glycolipids, or rhamnolipids. Additionally, the treatment regimen can include a natural or synthetic ion-exchange media such as zeolite, manganese greensand, synthetic resins, natural clay minerals, functionalized silica, or carbon-based ion exchangers.

Further embodiments involve applying a treatment regimen to the pre-treated fluid to remove remaining hydrocarbons, treatment chemicals from prior treatment steps, organics, hydrogen sulfide, suspended solids down to one (1) micron, additional flocculant solids down to one (1) micron, cationic content, or anionic content. Removing suspended or flocculated particles may involve using DAF, SAF, a weir tank, media bed, membrane, centrifuge, clarifier, or hydrocyclone.

In another embodiment, performing critical material extraction includes ion exchange, adsorption, membrane-based separation, solvent extraction, electrochemical extraction, selective precipitation, or a hybrid process combining two or more of these methods. Critical material extraction may involve exposing the pre-treated fluid to a sorbent composition for a contact time, wherein the sorbent composition is one or more of a lithium manganese oxide (LMO), a lithium manganese oxide (LMO)-type lithium ion-sieve (LIS), a titanate sorbent, or an aluminate sorbent. After the contact time elapses, the liquid is removed from the sorbent composition, which is then rinsed with a reagent to produce a lithium eluate. The initial lithium concentration of the lithium eluate is concentrated to a lithium cycle concentration between 100-500 parts-per-million (ppm) per cycle, forming a metal-rich product in solution.

In yet another embodiment, a method includes receiving volume of a pretreated midstream liquid resource from a pipeline, tank, midstream recycling facility, or desalination site, where the resource has been treated with a chemical-treatment regimen. The method involves removing at least one chemical treatment from the chemical-treatment regimen, applying a treatment to the pre-treated fluid, removing hydrocarbons, organic matter, hydrogen sulfide, ions, or suspended solids, and performing critical-material extraction.

Further embodiments describe a system for enhancing or optimizing the extraction of lithium from a midstream-liquid resource. The system comprises a pre-treatment station to receive a volume of a midstream-liquid resource, pre-treat the volume, and separate it into a retentate and a filtrate. A filtration station receives the pre-treated fluid to remove impurities, and a direct-lithium-extraction (DLE) unit mixes the pre-treated fluid containing lithium with a sorbent composition, applies a rinse to the sorbent composition, and uses a reagent to produce a lithium product in solution. In some embodiments, the system also may include a reverse-osmosis station to increase the concentration of lithium within the lithium product in solution.

In some embodiments, a method is provided for pretreating a midstream-liquid resource to enhance or to optimize lithium extraction. The method includes receiving a volume of midstream-liquid resource from a pipeline or disposal site. This liquid resource typically has a turbidity of at least 100 Nephelometric Turbidity Units (NTU), Total Suspended Solids (TSS) of at least 100 mg/L, and may contain a negative Oxidation-Reduction Potential (ORP) or an iron content greater than 5 mg/L.

In some embodiments, the method further includes pre-treating the volume of the midstream-liquid resource by separating it into a retentate and a filtrate. The filtrate, now a pre-treated fluid, achieves a turbidity of less than 20 NTU, TSS of less than 200 mg/L, a positive ORP, and an iron content of less than 5 mg/L.

In some embodiments, the pre-treated fluid undergoes further treatment to remove hydrocarbons, organic matter, ions, or suspended solutions, and to perform critical-material extraction. This treatment ensures the fluid is suitable for lithium-extraction processes.

In some embodiments, pre-treating the midstream-liquid resource involves applying an oxidizer and removing a flocculant. The oxidizer can include agents such as hydrogen peroxide, ozone, bubbled oxygen, nanobubbled oxygen, carbon dioxide (CO2), aeration, chlorine, chlorine dioxide, sodium hypochlorite, peracetic acid, potassium permanganate, or calcium hypochlorite. Flocculants such as polyacrylamide, polyethyleneimine, Polyacrylamide (PAM), Polyamines, PolyDADMAC (Polydiallyldimethylammonium chloride), Starch-based flocculants, or Chitosan are removed using filtration methods like sand filtration, multimedia filtration, cartridge filters, bag filters, disc filters, membrane filtration (microfiltration, ultrafiltration), and activated carbon.

In some embodiments, the method also addresses the removal of iron from the midstream-liquid resource. Techniques include adding an oxidizing agent to convert soluble iron ($Fe^{2+}$) to precipitate insoluble iron ($Fe^{3+}$) and applying filters to remove the precipitated iron. Other methods involve using ion-exchange resins, adsorbing iron ions with activated carbon filtration, and applying ultrafiltration or reverse osmosis.

In some embodiments, hydrogen-sulfide ($H_2S$) removal from the midstream-liquid resource is another aspect of the pre-treatment. This involves oxidizing the liquid resource to convert $H_2S$ to elemental sulfur or sulfate, applying activated-carbon filtration to adsorb $H_2S$, and using iron-based adsorbents or iron-sponge systems.

In some embodiments, further treatment of the pre-treated fluid includes applying various filtration methods such as media beds, bag filtration, sand media, ceramic filtration, ceramic ultrafiltration, ceramic nanofiltration, divalent filtration systems, membrane filtration systems, tubular-membrane filtration, spiral-wound-membrane filtration, or flat-sheet-membrane filtration.

In some embodiments, the removal of hydrocarbons, organic matter, ions, or suspended solutions from the pre-treated fluid is achieved using dissolved-air flotation (DAF), suspended-air flotation (SAF), weir tanks, media beds, membranes, centrifuges, clarifiers, and hydrocyclones.

In some embodiments, critical-material extraction from the pre-treated fluid is performed using techniques such as ion exchange, adsorption, membrane-based separation, solvent extraction, electrochemical extraction, selective precipitation, and hybrid processes combining two or more of these methods.

In some embodiments, exposing the pre-treated fluid to a sorbent composition for a contact time is included. The sorbent composition may include lithium manganese oxide (LMO), lithium-manganese-oxide (LMO)-type lithium ion-sieve (LIS), titanate sorbent, or aluminate sorbent. After the contact time, the liquid is removed from the sorbent, and the sorbent is rinsed with a reagent to produce at least one lithium eluate.

In some embodiments, the method also includes concentrating the initial lithium concentration of the lithium eluate to a lithium-cycle concentration between 100-500 ppm per cycle, thereby forming a lithium product in solution.

In some embodiments, a method for enhancing or optimizing lithium extraction from a pretreated volume of a midstream-liquid resource is provided. The method involves receiving the pretreated fluid from a midstream recycling facility or desalination site, and removing, from the pre-treated fluid, hydrocarbons, organic matter, ions, or suspended solutions. The pretreated fluid is then exposed to a sorbent composition, and after a contact time, the liquid is removed, and the sorbent is rinsed with a reagent to produce lithium eluate.

In some embodiments, the pre-treated fluid undergoes polishing to remove remaining hydrocarbons, treatment chemicals, organics, suspended solids down to one (1) micron, additional flocculant solids down to one (1) micron, cationic content, and anionic content.

Embodiments also include a system for enhancing or optimizing lithium extraction from a midstream-liquid resource. The system comprises a pre-treatment station to receive and pre-treat the liquid resource, a filtration station to receive and further purify the pre-treated fluid, and a direct-lithium-extraction (DLE) unit to perform lithium extraction.

In some embodiments, the DLE unit includes a tank for mixing the pre-treated fluid with a sorbent composition for a contact time, a rinse station, and a reagent station. The metal of interest, such as lithium, is retained within the sorbent composition, vacates the pre-treated fluid after the contact time, and is subsequently rinsed to form a metal product in solution. A reverse-osmosis station may be included to concentrate the metal product further.

The DLE unit includes a tank for mixing the pre-treated fluid with a sorbent composition for a contact time, a rinse station, and a reagent station. The metal of interest, such as lithium, is retained within the sorbent composition, vacates the pre-treated fluid after the contact time, and is subsequently rinsed to form a metal product in solution. A reverse-osmosis station may be included to concentrate the metal product further.

DETAILED DESCRIPTION

Figure 1:
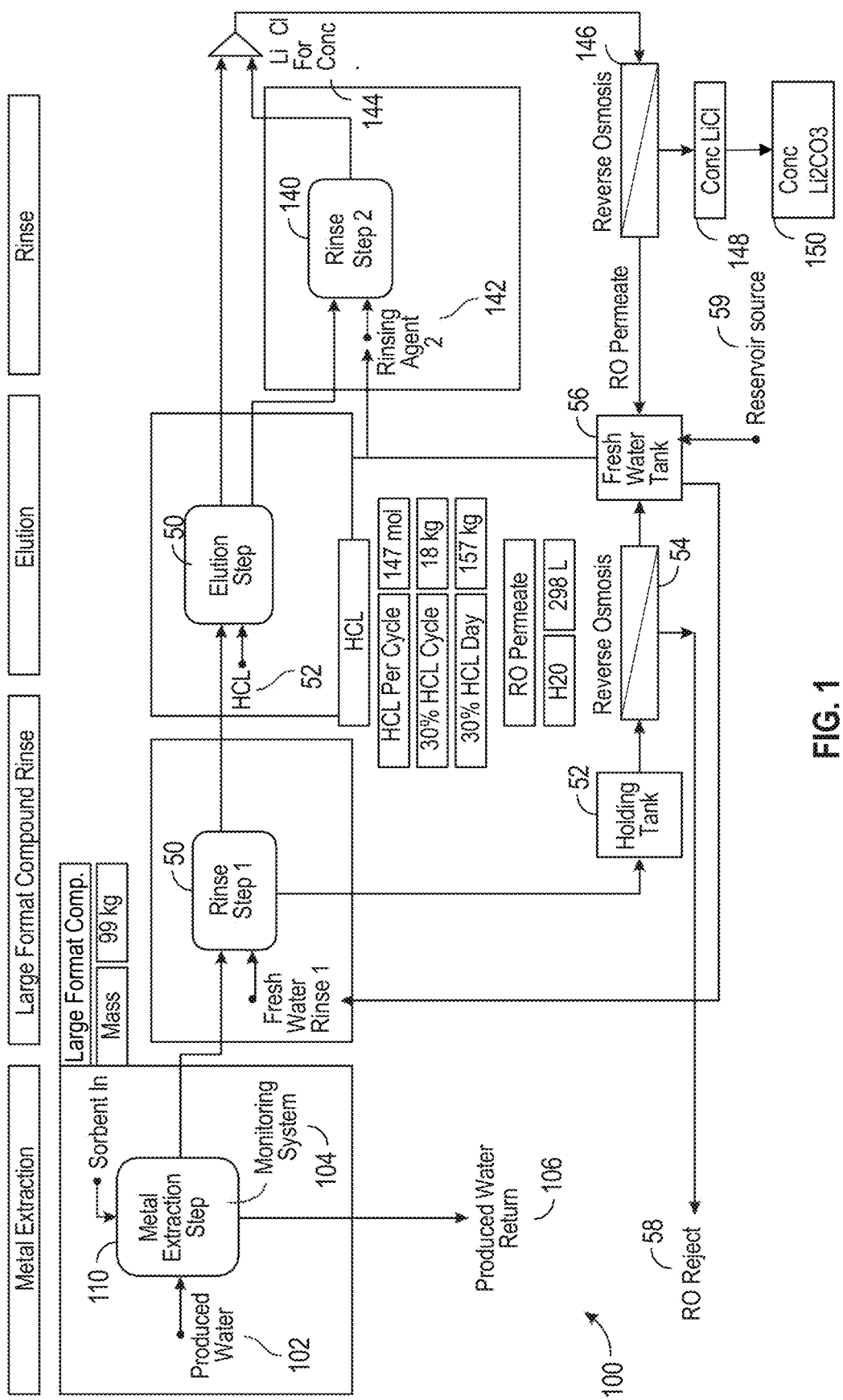
FIG. 1 is a flowchart illustrating a method for reducing a concentration of at least one metal, according to some embodiments of the present disclosure.

"Fluid oil and gas waste" refers to waste containing salt or other mineralized substances, brine, hydraulic-fracturing fluid, flowback water, produced water, or other fluid that arises out of or is incidental to the drilling for or production of oil or gas. Midstream-liquid resources, such as produced water, play a crucial role in the ecosystem of direct lithium extraction (DLE). As a byproduct of oil and gas extraction, produced water and its management are essential for both environmental and operational efficiency.

Produced water is generally defined as any water produced concurrently with the production of oil and gas hydrocarbons from underground reservoirs or subterranean flows, including, but not limited to, naturally occurring formation water, flowback water, recycled water, or water injected into reservoirs during hydraulic fracturing or other injection methods. While produced water has been provided as an example application within the present disclosure, the present disclosure is broadly applicable to any subsurface fluid containing a metal. Non-limiting examples of subsurface fluid containing a metal include brines produced from hydrocarbon reservoirs exclusively for metal extraction or as a secondary application (e.g., extracting a metal from a geothermal brine). In some embodiments, the present disclosure may be utilized to extract a metal or metals of interest from a recycle pit or other holding tank or pond on the surface.

Midstream-treatment facilities, including pipeline access points, disposal sites, midstream-recycling plants, and desalination plants, play roles in processing produced water.

When produced water reaches the surface, it often contains a wide array of chemicals and substances. Some chemicals are native to the subsurface formation, while others are introduced during the oil and gas extraction process, while more are added to maintain infrastructure and support transport in pipeline infrastructure. Additional chemicals and treatment regimens are applied to the produced water to remove hydrocarbons, organic matter, hydrogen sulfide, ions, or suspended solids. The chemical and physical property requirements of produced water vary along the life cycle of the produced water. For exemplary purposes, the standard of treatment of produced water ranges from no more treatment than the application of a biocide, while other treatments may apply more complex treatment regimens to remove toxins, heavy metals, and dissolved solids from produced water. The varying quality of produced water complicates valuable midstream treatments like Direct Lithium Extraction whose performance can be reduced by the contents of a midstream-liquid resource. To further illustrate the varying quality of produced water, consider the following:

Pipeline

Produced water finds its way to midstream sites as a midstream-liquid resource through a well-coordinated network of pipelines and transportation logistics. Midstream-liquid resources are extracted with hydrocarbons and are separated from the oil and gas at the wellhead. The initial separation process may involve basic treatment to remove free oil and large particulates. At the surface, additional chemical treatments can be added to the midstream-liquid resource. Examples of treatments include chelating agents, friction reducers, corrosion inhibitors, scale inhibitors, demulsifies, paraffin inhibitors, hydrate inhibitors, pH adjusters, biocides, coagulants, flocculants, surfactants, or anti-foaming agents.

These individual treatments and combinations of individual treatments used in midstream-liquid-resource treatment regimens can pose several challenges for the extraction of critical metals, such as lithium in Direct Lithium Extraction. Non-limiting examples of treatments used in a midstream-liquid resource can significantly impact the performance of sorbents, ion-exchange resins, and lithium-selective membranes used in direct-metal-extraction processes like direct-lithium-extraction (DLE) processes. These impacts may manifest through fouling, chemical interactions, and degradation of materials.

For example, chelating agents, such as EDTA, are introduced to bind metal ions and prevent scale formation. However, these agents also can bind to essential ions used in sorbents and resins, reducing their capacity to selectively capture lithium ions. For lithium-selective membranes, chelating agents can form stable complexes that clog membrane pores, reducing permeability and selectivity. In some embodiments, when the metal-extraction system is an electrochemical Direct-Lithium-Extraction (DLE) system, chelating agents can bind to lithium ions, forming complexes that reduce the availability of free lithium for extraction. This binding can decrease the efficiency of the electrochemical process, as the system relies on the selective movement of lithium ions. In some embodiments, chelating agents may compete with other metal ions in the solution, potentially altering the effectiveness of membranes and electrodes and reducing lithium-recovery rates. These agents also can interact with the materials used in the system, causing fouling or degradation, which can decrease the overall efficiency and lifespan of the equipment.

When friction reducers like polyacrylamides (PAM) are present in a midstream liquid resource, they can impact significantly the performance of these membrane systems. PAM and similar polymers can adhere to the membrane surface, forming a coating that blocks pores, leading to fouling. This fouling increases the pressure drop across the membrane, requiring more energy to maintain flow rates and ultimately reducing the efficiency of the filtration process. In lithium-selective membranes, such as those used in DLE systems, this fouling can be particularly detrimental as it diminishes the selective permeability of the membrane, reducing lithium-recovery rates. Additionally, these friction reducers can coat sorbents and resins used in ion-exchange processes, decreasing their effectiveness, and can interfere with electrochemical DLE processes by altering the conductivity and flow characteristics of the treated fluids. The presence of friction reducers like PAM in low ppm concentrations is challenging to detect, further complicating the maintenance and enhancement or optimization of these sensitive systems.

Friction reducers, typically polyacrylamides (PAM), are used to minimize resistance within pipeline systems. These polymers can form coatings on sorbents and resins, leading to fouling and decreased efficiency. For example, when these polymers adhere to lithium-selective membranes, they block pores and increase pressure drops, thereby diminishing the membrane's performance. This issue is not limited to lithium-selective membranes; non-selective membranes, such as ultrafiltration, nanofiltration, and microfiltration membranes, also can be impacted. These membranes are often used in pre-treatment and filtration processes to remove suspended solids, organic matter, and other impurities before the fluid reaches more-sensitive stages of processing. Regardless of the selectivity of the membrane, the presence of friction reducers can reduce, significantly, overall system efficiency by causing membrane fouling, leading to increased maintenance and operational costs. While friction reducers like PAM have substantial negative impacts on sensitive DLE systems, they can be difficult to detect, and even when present, ppm concentrations of friction reducers are challenging to determine.

Corrosion inhibitors, such as phosphonates, protect metal surfaces from corrosion. However, they can deposit on sorbents and resins, leading to fouling. On lithium-selective membranes, these inhibitors can form protective films that block ion-transport channels, reducing the membrane's effectiveness in lithium separation. Scale inhibitors, like phosphonates and polyacrylates, prevent scale formation but can interact negatively with sorbents and resins by forming precipitates that block active sites. With regard to lithium-selective membranes, these inhibitors can deposit and cause scaling, which reduces membrane efficiency and increases downtime and further contributes to costly maintenance requirements.

Demulsifiers break emulsions into separate oil and water phases. They can introduce organic contaminants that adsorb onto sorbents and resins, causing fouling and reducing their ion-exchange capacities. These organic contaminants can also form fouling layers on lithium-selective membranes, impairing their function. Paraffin inhibitors prevent paraffin deposition but can adhere to sorbents and resins, causing fouling. On lithium-selective membranes, these inhibitors can coat the surface, reducing permeability and selectivity by blocking the pores essential for lithium-ion transport. Hydrate inhibitors, such as methanol, can introduce organic loads into produced water, leading to fouling of sorbents and resins. These organic compounds can also cause fouling on lithium-selective membranes, reducing their efficiency and lifespan. pH adjusters, such as sodium hydroxide and sulfuric acid, are used to control the pH levels of produced water. Extreme pH conditions can degrade the materials of sorbents and resins, reducing their capacity and effectiveness. For lithium-selective membranes, both highly acidic (pHs below 3) and highly basic conditions can hydrolyze the membrane material, leading to structural damage and reduced performance.

Biocides, for example oxidizers like chlorine and hydrogen peroxide, are used to disinfect produced water. Oxidizers may attack the polymeric material of lithium-selective membranes, leading to loss of selectivity and increased degradation rates. Coagulants, such as aluminum sulfate, are used to aggregate fine particles into larger ones for easier removal. These coagulants can form precipitates on sorbents and resins, blocking active sites and reducing capacity. On lithium-selective membranes, coagulated particles can clog the pores, reducing permeability and increasing operational costs.

A number of flocculants may be present in a midstream-liquid-resource system. Non-limiting examples of flocculants include Polyacrylamide (PAM), Polyethyleneimine (PEI), PolyDADMAC (Polydiallyldimethylammonium chloride), Polyamines, starch-based flocculants, Chitosan, Alum (Aluminum Sulfate), Ferric Chloride, Ferric Sulfate, or Calcium Hydroxide (Lime). Flocculants, like polyacrylamides, aggregate suspended particles. They can create large flocculant aggregates that block the pores of sorbents and resins, leading to fouling. Similarly, these aggregates can block the pores of lithium-selective membranes, reducing their selectivity and effectiveness. Flocculants can impact Direct Metal Extraction (DME) systems, particularly those involving sorbents, ion-exchange resins, and membranes. In systems utilizing sorbents, flocculants may cause the aggregation of suspended solids, leading to fouling or clogging of the sorbent materials, thereby reducing their efficiency in selectively adsorbing lithium ions. For ion-exchange resins, flocculants can interfere by binding with other ions or organic materials, which binding can decrease the resin's capacity for lithium exchange and hinder overall system performance. When it comes to membranes, including lithium-selective and other types, flocculants can cause fouling that obstructs the flow of liquids through the membrane, reducing its effectiveness and potentially leading to increased maintenance needs and operational costs. In electrochemical DLE systems, the presence of flocculants can further exacerbate these issues by interfering with the selective transport of lithium ions, diminishing recovery rates, and requiring more-frequent cleaning or replacement of membrane and electrochemical components. This combined impact can significantly reduce the operational efficiency and economic viability of the DLE process.

Surfactants, such as sodium dodecyl sulfate (SDS), reduce surface tension and emulsify oils. They can form micelles that adhere to sorbents and resins, causing fouling and reducing ion-exchange capacities. On lithium-selective membranes, surfactants can form micelles that block pores and reduce membrane efficiency.

Anti-foaming agents, often silicone-based, are used to reduce foam formation. These agents can introduce hydrophobic substances that foul sorbents and resins, reducing their effectiveness. On lithium-selective membranes, these hydrophobic layers can block pores, leading to decreased permeability and increased maintenance needs.

Midstream Treatment Process

Following this, the midstream-liquid resource is transported via pipelines to centralized midstream facilities for further treatment. In some cases, tanker trucks are used, especially when pipelines are not feasible. These midstream sites, including disposal facilities, transfer facilities, treatment plants, storage tanks and ponds, recycling facilities, and desalination plants, are strategically located to handle large volumes of produced water efficiently. Sometimes these locations are equipped with advanced technologies to treat the water, removing contaminants and extract valuable metals, like lithium. This system can ensure that produced water is managed effectively, minimizing environmental impact and enabling resource recovery.

The midstream-liquid resource may contain a complex mixture of organic and inorganic substances, some of which include:

Salts: High levels of total dissolved solids (TDS) ranging from 50,000 to over 250,000 ppm. Non-limiting examples of inorganic substances associated with salt, include sodium chloride (NaCl), which is commonly present as table salt in significant quantities, calcium sulfate ($CaSO_4$), also known as gypsum, which can precipitate and cause scaling, magnesium chloride ($MgCl_2$), which contributes to the hardness of water and scaling potential, and bicarbonates ($HCO_3$), which can also contribute to scaling issues.

Flocculants: Used in various stages of water treatment to aggregate and remove suspended particles from the liquid resource. These chemicals aid in the coagulation and flocculation processes, where small particles are bound together to form larger aggregates that can be more easily removed by mechanical-filtration techniques. Non-limiting examples of flocculants that may be present in the midstream-liquid resource include polyacrylamide (PAM), polyethyleneimine, polyamines, polyDADMAC (polydiallyldimethylammonium chloride), starch-based flocculants, or chitosan. The presence of flocculants is critical for effective separation and treatment processes but can pose challenges in downstream processing, particularly in sensitive operations like critical-material extraction, where they can interfere with sorbents, ion-exchange resins, and membranes.

Metals: Trace amounts of metals are often found in produced water. While some are desirable, like lithium, which can be concentrated through advanced processing, others, like iron, are removed to support further processing or beneficial reuse.

Hydrocarbons: Residual oil and grease from the oil-and-gas extraction process.

Chemicals: Additives such as flocculants and surfactants used in drilling and hydraulic-fracturing operations may be present in the midstream-liquid resource. In primary recovery, chemicals like demulsifiers are used to break emulsions formed between oil and water. During secondary recovery, water flooding can introduce scale inhibitors and corrosion inhibitors to protect equipment and pipelines. In tertiary recovery, also known as enhanced oil recovery (EOR), a variety of chemicals may be introduced, including surfactants, polymers, and alkaline agents to reduce interfacial tension and increase oil mobility. These chemicals can be broadly categorized into organic, inorganic, and biological classes, each with distinct roles and effects on the recovery process. For instance, surfactants (organic compounds) are used to reduce the interfacial tension between oil and water, facilitating the movement of oil through the reservoir. Polymers, often organic, are injected to increase the viscosity of the displacing water, improving its ability to push oil towards production wells. Alkaline agents, typically inorganic, are used to react with acidic components in the crude oil, generating in-situ surfactants that further aid in oil recovery.

Additionally, carbon dioxide ($CO_2$) and steam injection, common EOR methods, may leave residual chemicals that affect water chemistry. Paraffin inhibitors are often used throughout these processes to prevent wax deposition, which can clog pipelines and equipment. Biological EOR methods, such as microbial-enhanced oil recovery (MEOR), introduce specific strains of bacteria to metabolize heavy hydrocarbons or generate gas, aiding in the displacement of oil. These treatments, while performing essential functions, often result in trace compounds remaining in midstream-liquid resources that, when subjected to traditional disposal methods, can persist at levels that significantly impact the effectiveness of critical-metal-extraction systems. These chemicals, along with residuals from earlier stages, contribute to the complexity of treating and processing the midstream-liquid resource. Chemical treatments such as oxidizers, including chlorine dioxide and sodium hypochlorite, are frequently used to break down organic contaminants and neutralize hazardous compounds, leaving byproducts such as chlorinated organic compounds. Coagulants and flocculants, applied to aggregate and remove suspended solids, may result in residual flocculated particles that require further filtration. Biocides, applied to control microbial growth, can leave byproducts such as dead biomass and organic residuals that may contribute to biofouling in subsequent processing stages. Additionally, bioremediation efforts using bacteria or enzymes to degrade hydrocarbons may produce metabolic byproducts like organic acids and gases, further complicating the treatment of the midstream-liquid resource. These chemicals and their byproducts contribute to the complexity of treating and processing the midstream-liquid resource.

Biocides and Corrosion Inhibitors: Used to prevent microbial growth and equipment degradation.

Other Contaminants: After pre-treatment, the midstream-liquid resource may still contain a variety of chemicals and compounds. These can include suspended solids, such as fine particulate matter that was not fully removed during the initial filtration steps. Iron is often present as both dissolved and particulate forms, which can contribute to scaling and corrosion if not adequately treated. Hydrogen sulfide ($H_2S$), a toxic and corrosive gas, may remain in the liquid and pose safety and handling challenges. Additionally, residual chemicals from earlier stages of treatment, such as biocides, corrosion inhibitors, and friction reducers, can persist in the midstream-liquid resource. Trace amounts of scale inhibitors, demulsifiers, paraffin inhibitors, and pH adjusters also may be present, each contributing to the complexity of further treatment and extraction processes. These residual contaminants typically must be carefully managed to ensure the effectiveness of subsequent processing steps, such as critical-material extraction. ($H_2S$).

Water Quality: Total Dissolved Solids (TDS)

The Total Dissolved Solids (TDS) content in midstream-liquid resources can vary significantly between different geological formations and even within the lifecycle of a well. For illustrative purposes, the midstream-liquid resource may be further characterized by one or more water-quality metrics. Non-limiting examples of water-quality metrics in some embodiments include turbidity, Total Suspended Solids (TSS), Oxidation-Reduction Potential (ORP), and the midstream-liquid resource may be characterized by the presence of heavy metals, like iron, and compounds like $H_2S$ in mg/L. For example, a turbidity level of at least 100 Nephelometric Turbidity Units (NTU), a Total Suspended Solids (TSS) of at least 100 mg/L and at least one of a negative Oxidation-Reduction Potential (ORP) to up to +200 mV, and an iron content greater than 5 mg/L may be used to characterize midstream-liquid resource. The following ranges are provided by United States Geology Survey (USGS) resources available at the time of filing and demonstrate the variability in ways midstream-liquid resources are described:

Smackover Formation: In the Smackover formation, the TDS content in midstream-liquid resources has been observed to range from a minimum of 1,230 mg/L to a maximum of 377,000 mg/L. This substantial range indicates the highly variable nature of water quality in this formation.

Cotton Valley Formation: For the Cotton Valley formation, the TDS content ranges from a minimum of 5,241 mg/L to a maximum of 366,666 mg/L. This wide range reflects the diverse conditions and compositions encountered in different parts of the formation.

Wolfcamp Formation: The Wolfcamp formation exhibits a TDS range from 60,950 mg/L to 248,000 mg/L. Additionally, there is data indicating that TDS levels can vary within the same well, with some batches testing as low as 2,000 mg/L and as high as 140,000 mg/L in other instances. In its entirety, the disclosure of 'Water Desalination: Principles, Technologies, and Applications,' authored by John Smith et al., and published in *Desalination*, DOI: 10.1016/j.desal.2023.029X, is incorporated herein by reference.

Spraberry Formation: In the Spraberry formation, TDS levels range from 82,430 mg/L to 184,622 mg/L. This range highlights the varying water quality that can be expected from different extraction points within the formation.

Bone Spring Formation: The Bone Spring formation shows a TDS range from 60,000 mg/L to 300,000 mg/L. Similar to other formations, this range indicates substantial variability in water composition, affecting the treatment processes.

These ranges illustrate the challenges faced in treating midstream-liquid resource from different formations. Even within a single well, the TDS as well as other water-quality metrics can fluctuate greatly, often necessitating robust and adaptable treatment processes to handle the variability in water quality. Such variations underscore the importance of continuous monitoring and tailored treatment strategies to enhance or optimize resource extraction and environmental management. But these ranges also fail to point out the chemical treatments and other treatments one may expect in the midstream sites. Non-limiting examples of locations for midstream-liquid resource sites include pipelines, which transport midstream-liquid resource from extraction sites to treatment facilities; disposal sites, designated for the safe disposal of wastewater through deep-well injection; midstream treatment plants, where contaminants such as hydrocarbons and dissolved salts are removed; midstream recycling plants, which treat midstream-liquid resource for reuse in oil & gas applications and desalination plants, which remove high concentrations of dissolved salts to make the water suitable for reuse or discharge.

While formations have traditionally been characterized by their Total Dissolved Solids (TDS) values, other physical characterizations of midstream liquid resources may also be crucial in developing effective pre-treatment regimens. Non-limiting examples of such characterizations include pH, which measures the acidity or alkalinity of the liquid and can influence the solubility of metals and the effectiveness of chemical treatments; turbidity, indicating the presence of suspended particles in the water, which can affect filtration and separation processes; oxidation-reduction potential (ORP), reflecting the liquid's ability to either gain or lose electrons, impacting the selection of oxidation or reduction treatments; iron content, which measures the concentration of dissolved iron that can precipitate and cause scaling; biochemical oxygen demand (BOD), which gauges the amount of oxygen required to break down organic matter, indicating the level of organic pollution; and sulfide concentration, which determines the presence of hydrogen sulfide, a toxic and corrosive compound requiring specific removal strategies. These examples are provided for illustrative purposes, and other measurements may also be employed to directly or indirectly develop and monitor pre-treatment regimens.

FIG. 1 is an exemplary system 100 configured to extract a desired metal from a volume of midstream-liquid resource, according to some embodiments of the present disclosure. For a discussion of direct-lithium-extraction systems, see Putro, Cahyo & Anderson, Corby, (2022), INVESTIGATION OF FACTORS AFFECTING DIRECT LITHIUM EXTRACTION WITH ION EXCHANGE, which is hereby incorporated by reference. The system 100 depicts four phases that may be implemented to extract a metal from midstream-liquid resource. The first step, the metal-extraction step 110, may include receiving midstream-liquid resource 102 into the system 100.

Receiving the midstream-liquid resource 102 may include moving the midstream-liquid resource from a storage station (e.g., a pond or tank), a shipping container, or a well using a gravity feed, a pump system, or siphon mechanism to a batch- or continuous-processing system 100. Alternatively, in some embodiments, receiving the midstream-liquid resource 102 may include receiving the midstream-liquid resource from a transportation vehicle (e.g., a trailer, a tanker, a rail car). In some embodiments receiving the midstream-liquid resource 102 may include receiving the midstream-liquid resource from a fixed assembly, such as a pipeline. In some embodiments, the midstream-liquid resource 102 is infused with nanobubbles, which can support the removal of oil, flocculants, hydrogen sulfide, solid iron precipitants, or the like present in the midstream-liquid resource.

Receiving a midstream-liquid resource 102 at a treatment station 101 involves several critical processes to enhance or optimize the extraction of lithium and other valuable materials. At a treatment station, for example pipelines, tanks, or disposal sites, a treatment or treatment regimen may be applied to the midstream-liquid resource 102. For illustrative purposes, a treatment may refer to the application of a single chemical, mechanical, biological, or thermal treatment. In instances in which a treatment is applied multiple times, for example based on a schedule of alternating volumes of midstream-liquid resource 102, or combining multiple treatment types, the terms pre-treatment and treatment regimens are used.

Figure 2:
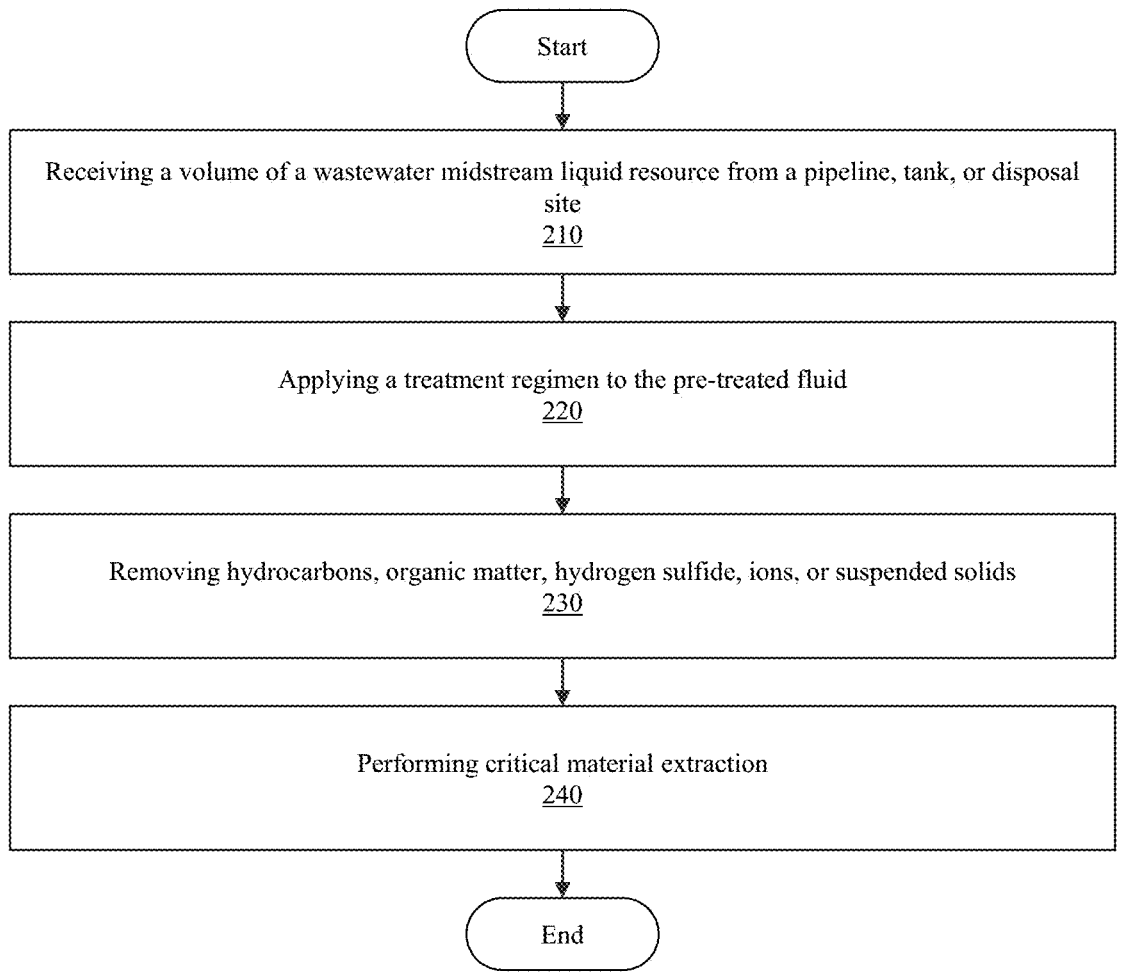
FIG. 2 is a flowchart illustrating a method for enhancing or optimizing extraction of lithium, according to some embodiments of the present disclosure.

FIG. 2 is a flowchart that describes a method for enhancing or optimizing extraction of lithium from a midstream-liquid resource, according to some embodiments of the system of FIG. 1 of the present disclosure. In some embodiments, at 210, the method may include receiving a volume of a midstream-liquid resource (e.g., wastewater) from a pipeline, tank, or disposal site. Non-limiting examples of exemplary pre-treatments and locations where the pre-treatments may be applied are provided according to some embodiments of the present disclosure.

Pre-Treatment

When the treatment station 101 is a pipeline, non-limiting examples of common pre-treatments and treatment regimens applied and chemical present within the midstream-liquid resource 102 may include:

Biocides: Used to control microbial growth and prevent biofouling within the pipeline. Examples include oxidizers, glutaraldehyde, quaternary ammonium compounds (QUATs), DBNPA (2,2-Dibromo-3-nitrilopropionamide), and THPS (Tetrakis (hydroxymethyl) phosphonium sulfate).

Friction Reducers: Applied to reduce friction between the fluid and the pipeline walls, enhancing flow efficiency. Friction reducers are often added during hydraulic-fracturing operations or in the operations of midstream-water pipelines.

Corrosion Inhibitors: May be essential for protecting the metal surfaces of the pipeline from corrosion caused by the saline and acidic nature of produced water. Examples of corrosion inhibitors include amines, phosphate esters, and imidazolines.

Scale Inhibitors: Used to prevent the formation of mineral scales that can clog and damage the pipeline. Examples of scale inhibitors include phosphonates and polyacrylates.

When the treatment station 101 (FIG. 1) is a tank, non-limiting examples of common pre-treatments and treatment regimens may include:

Biocides: Similar to pipeline treatments, biocides are used to control microbial growth in storage tanks to prevent biofouling and maintain water quality during storage.

Demulsifiers: Applied to separate oil and water phases in the stored produced water. Demulsifiers help in enhancing the separation efficiency before further treatment.

Paraffin Inhibitors: Used to prevent the deposition of paraffin waxes that can restrict fluid flow and reduce efficiency in storage tanks.

Hydrate Inhibitors: Applied to prevent the formation of gas hydrates, which can obstruct flow and damage equipment in storage conditions.

When the treatment station 101 (FIG. 1) is a disposal site, non-limiting examples of common pre-treatments and treatment regimens may include the following:

pH Adjusters: Used to maintain optimal pH levels, facilitating or ensuring the effectiveness of other chemical treatments and protecting equipment from corrosion and scaling.

Oxidizers: Applied to oxidize contaminants like hydrogen sulfide and organic matter, improving water quality and reducing odors.

Coagulants and Flocculants: Used to aggregate suspended particles, making them easier to remove during filtration processes at disposal sites. Examples of coagulants and flocculants include polyaluminum chloride, aluminochlorohydrate, polyDADMAC, and starch-based flocculants.

Surfactants: Applied to reduce surface tension and improve the efficiency of separation processes, enhancing the removal of oils and organic matter.

When the treatment station 101 (FIG. 1) is a midstream recycling facility, non-limiting examples of common pre-treatments and treatment regimens may include the following:

Biocides: May be essential for maintaining water quality by controlling microbial growth during the recycling process.

Flocculants.Flocculants are commonly used to promote the aggregation of suspended particles in produced water and other wastewater midstream liquids, facilitating the separation of solids from liquids in various stages of the oil and gas production process. Non-limiting examples include Polyacrylamides (PAM), Polyethyleneimine (PEI), Poly-DADMAC (Polydiallyldimethylammonium chloride), Polyamines, Chitosan, Starch-based flocculants, Ferric chloride, Aluminum sulfate (alum), Ferric sulfate, Calcium hydroxide (lime).

Filtration Systems: Including media filtration, cartridge filters, bag filters, disc filters, membrane filtration, activated carbon, weir tank, settling tanks, dissolved-air flotation (DAF), and suspended-air flotation (SAF). These systems can be used to remove suspended solids, hydrocarbons, and other contaminants.

Desalination Processes: Used to concentrate the total dissolved solids (TDS) through membrane- or thermal-evaporation processes, making the water suitable for reuse.

Ion-Exchange Processes: Applied to alter the cationic or anionic constituency of the water, enhancing the removal of specific ions and improving water quality for reuse of the water.

When the treatment station 101 (FIG. 1) is a desalination plant, non-limiting examples of common pre-treatments and treatment regimens may include the following:

Pre-treatment Filtration: Using sand filters, media filters, or membrane filtration to remove suspended solids and other large particulates before desalination.

Scale and Corrosion Inhibitors: Used to protect the desalination equipment from scaling and corrosion caused by the high salinity of produced water.

Anti-foaming Agents: Applied to control foam formation during the desalination process, ensuring smooth operation and preventing overflow or damage to equipment.

Polishing Filtration: Used after desalination to further remove any remaining impurities, ensuring high-quality water output. This can include reverse osmosis and nanofiltration.

These treatments and regimens ensure the efficient and effective processing of produced water, generally improving water quality and protecting infrastructure throughout the oil and gas industry. In some embodiments the midstream-liquid resource comprises a turbidity of at least 100 Nephelometric Turbidity Units (NTU), a Total Suspended Solids (TSS) of at least 100 mg/L and at least one of a negative Oxidation-Reduction Potential (ORP) to up to +200 mV or an iron content greater than 5 mg/L. The pre-treatment of the received 210 midstream liquid may minimize the quantity of TSS overall. In some embodiments applying a treatment regimen may result in a pre-treated fluid with a turbidity of less than 20 Nephelometric Turbidity Units (NTU), Total Suspended Solids (TSS) of less than 200 mg/L, a positive Oxidation-Reduction Potential (ORP), and an iron content of less than 5 mg/L.

Still referring to FIG. 2, at 220, the method may include applying a treatment regimen to the pre-treated fluid. In some embodiments, the method of applying a treatment regimen to the pre-treated fluid at 220 involves multiple stages aimed at enhancing the quality and suitability of the midstream-liquid resource for further processing, particularly for lithium extraction 240. This step 220 may involve removing contaminants and impurities that can affect the efficiency of the direct-lithium-extraction (DLE) process.

Applying a treatment to the pre-treated fluid at 220 may remove residual pre-treatment chemicals, their byproducts, and other remaining compounds in the midstream-liquid resource. This step may involve the removal of substances such as chelating agents, friction reducers, corrosion inhibitors, scale inhibitors, demulsifiers, paraffin inhibitors, hydrate inhibitors, pH adjusters, oxidizers, coagulants, flocculants, surfactants, and anti-foaming agents. In some embodiments, eliminating these chemicals and their byproducts prevents them from interfering with subsequent treatment stages and the direct-lithium-extraction process 240. The presence of these compounds may negatively impact the efficiency of ion-exchange resins and lithium-selective membranes by causing fouling, scaling, or chemical degradation. Additionally, removing these substances may ensure compliance with environmental regulations and minimize potential harm to downstream ecosystems. This thorough purification may enhance the quality and consistency of the fluid, enhancing or optimizing the conditions for lithium recovery 240.

In some embodiments, the treatment regimen 220 may include the removal of undesirable constituents, non-limiting examples of which include hydrocarbons, organic matter, heavy metals, hydrogen sulfide, pre-treatment chemicals, or pre-treatment chemical byproducts. While these examples have been provided in a list, it will be recognized that not all elements will be present at all steps within the midstream system. In some embodiments, removal of undesirable elements may be achieved through a combination or subcombination of chemical oxidation, biological treatment, and activated carbon filtration.

In some embodiments, chemical oxidation might involve applying oxidizers such as hydrogen peroxide, ozone, chlorine dioxide, and sodium hypochlorite to oxidize and break down organic contaminants and hydrogen sulfide into less harmful substances. In some embodiments, biological treatment within a treatment regimen 220 might be used to degrade organic matter through microorganisms that metabolize and decompose organic compounds. In a further embodiment, activated-carbon filtration may be used to adsorb organic contaminants, hydrocarbons, and volatile organic compounds (VOCs), significantly reducing their concentrations in the pre-treated fluid.

According to some embodiments, following the removal of organic contaminants and hydrocarbons, eliminating ions and suspended solids may be desirable within a treatment regimen 220. Flocculation and coagulation processes could introduce chemical coagulants (e.g., alum, ferric chloride) and flocculants (e.g., polyacrylamide, polyDADMAC) to aggregate suspended particles into larger flocs, facilitating their removal. Various filtration techniques, including media filtration with sand, anthracite, or other granular media, may be used to capture suspended solids. Membrane filtration techniques such as microfiltration, ultrafiltration, and nanofiltration might remove fine particulates and dissolved substances, including ions. Dissolved-air flotation (DAF) and suspended-air flotation (SAF) processes could inject air bubbles into the fluid, which attach to suspended particles, causing them to float to the surface for removal within a treatment regimen 220.

To control microbial growth and prevent biofouling during subsequent processing stages, biocides may be applied. Oxidizers might act as biocides, and additional biocides such as glutaraldehyde and quaternary ammonium compounds (QUATs) could be effective in eliminating a wide range of microorganisms. DBNPA and THPS are sometimes selected for their effectiveness in not only killing bacteria but also assisting with the removal of iron and other metals.

Adjustments to the chemical composition of the pre-treated fluid may be necessary to enhance or optimize conditions for lithium extraction 240. pH adjusters such as lime or sodium hydroxide might be used to maintain an enhanced or the optimal pH level for subsequent treatment processes. Ion-exchange processes, utilizing ion-exchange resins or media such as zeolite and synthetic resins, could selectively remove undesirable ions and replace them with more favorable ions.

A final polishing step may be implemented according to some embodiments as part of a pre-treatment regimen 220, a treatment regimen 230, or following lithium extraction 240. When part of a pre-treatment 220 or treatment regimen 230, the pre-treated fluid meets all quality requirements before entering the direct-lithium-extraction process. High-efficiency polishing filters, including media beds, cartridge filters and disc filters used individually or in combination, may remove any remaining particulates down to one (1) micron. In some embodiments, polishing may be accomplished using media beds. Reverse-osmosis processes might further concentrate the lithium content while removing residual dissolved solids and contaminants, producing high-purity water and a lithium-enriched concentrate.

This treatment regimen can remedy challenges introduced using traditional pre-treatment methods. By removing contaminants that interfere with the direct-metal extraction, like DLE 240, the efficiency and yield of lithium extraction can be enhanced. The removal of corrosive substances, scaling agents, or biofouling organisms may prolong the lifespan and operational reliability of the extraction equipment. Furthermore, the treatment processes 230 ensure that the wastewater discharged meets or possibly exceeds environmental regulations, minimizing environmental impact.

At 230, the method may include removing hydrocarbons, organic matter, hydrogen sulfide, ions, or suspended solids. The treatment regimen 230 may involve several processes and enhancements depending on the specific contaminants and the desired purity levels. Common pre-treatments include applying oxidizers, flocculants, coagulants, and surfactants to improve the separation efficiency of the subsequent treatments.

In some embodiments, oxidizers such as hydrogen peroxide, ozone, bubbled oxygen, nanobubbled oxygen, carbon dioxide (CO2), aeration, chlorine, chlorine dioxide, sodium hypochlorite, peracetic acid, potassium permanganate, or calcium hypochlorite may be applied. These oxidizers can help break down complex organic compounds and reduce the biological load in the midstream-liquid resource. Flocculants, which may include polyacrylamide, polyethyleneimine, polyDADMAC (polydiallyldimethylammonium chloride), starch-based flocculants, or chitosan, are used to aggregate smaller particles into larger ones, making them easier to remove through filtration or flotation processes.

Coagulants such as polyaluminum chloride, aluminochlorohydrate, Polyaluminum Chloride (PAC), Aluminum Sulfate (Alum), Ferric Chloride, Ferric Sulfate, Ferrous Sulfate, Sodium Aluminate, or Calcium Hydroxide (Lime) may be employed to destabilize and bind suspended particles, facilitating their removal. Surfactants like polyethylene glycols (PEGs), alcohol ethoxylates, linear alkyl ethoxylates (LAEs), sodium dodecyl sulfate (SDS), sodium lauryl sulfate (SLS), octylphenol ethoxylates (OPEOs), nonylphenol ethoxylates (NPEOs), alkyl polyglycosides (APGs), cocamidopropyl betaine, saponins, glycolipids, or rhamnolipids may be used to alter the surface tension of the liquid, improving the separation of oil and water phases and enhancing the overall treatment efficiency.

The treatment regimen 230 may occur in various locations. Non-limiting examples of equipment that may be located, include dissolved-air flotation (DAF) units, suspended-air flotation (SAF) units, media-filtration systems, cartridge filters, bag filters, disc filters, membrane-filtration systems, activated-carbon units, and weir tanks. Each of these treatment locations plays a specific role in removing different types of contaminants. For example, DAF and SAF units are particularly effective in removing suspended solids and oils, while media filtration and membrane filtration systems may be used to capture finer particles and dissolved contaminants.

In some embodiments, the treatment regimen 230 may split the midstream-liquid resource into a retentate and a filtrate. The retentate may contain concentrated impurities such as hydrocarbons, organic matter, or suspended solids, while the filtrate represents the purified liquid with significantly reduced levels of contaminants. Examples of retentate include sludge, concentrated brine, or other waste products, whereas filtrate may consist of clear water with reduced turbidity and lower concentrations of dissolved solids.

Once the treatment regimen 230 has been completed, the further purified midstream-liquid resource, or filtrate, may be passed to a critical-material extraction 240. This step ensures that the liquid resource is adequately prepared for the selective recovery of valuable materials, such as lithium, from the purified stream. By effectively removing pre-treatment chemicals, their by-products, and other contaminants, the treatment regimen enhances the efficiency and efficacy of the critical-material extraction process, leading to higher yields and purer end products such as metal-rich products in solution.

FIG. 2 is a flowchart that describes the method, according to some embodiments depicted in FIG. 1 of the present disclosure. In some embodiments, at 210, the method may include applying at least one of media filtration, cartridge filters, bag filters, disc filters, membrane filtration, activated carbon, dissolved-air flotation (DAF), suspended-air flotation (SAF), and or a weir tank. At 220, the method may include removing precipitated emulsified or flocculated solids using media filtration, cartridge filters, bag filters, disc filters, membrane filtration, activated carbon, dissolved-air flotation (DAF), suspended-air flotation (SAF), a weir tank, or a settling tank.

In some embodiments, applying a treatment regimen to the pre-treated fluid may include 210 to 220. Removing hydrocarbons, organic matter, ions, or suspended solids further comprises applying at least one of a polyacrylamide (PAM), polyethyleneimine, polyamines, polyDADMAC (polydiallyldimethylammonium chloride), starch-based flocculants, chitosan, or another organic or inorganic flocculants.

In some embodiments, the treatment regimen at 230 may involve additional steps to ensure the thorough removal of contaminants and enhance the efficiency of the subsequent lithium-extraction process. The treatment locations for these regimens may include dissolved-air flotation (DAF) units, suspended-air flotation (SAF) units, media-filtration systems, cartridge filters, bag filters, disc filters, membrane-filtration systems, activated-carbon units, and weir tanks. Each of these locations plays a specific role in addressing different types of contaminants present in the pre-treated fluid.

For instance, oxidizers such as hydrogen peroxide, ozone, and chlorine dioxide may be applied to break down organic compounds and reduce biological loads. Flocculants like polyacrylamide and chitosan may be used to aggregate fine particles, making them easier to remove through filtration. Coagulants such as polyaluminum chloride and ferric chloride may help destabilize suspended particles, facilitating their removal. Surfactants like sodium dodecyl sulfate and nonylphenol ethoxylates may alter the surface tension, improving oil-water separation.

The treatment regimen at 230 may also involve splitting the midstream-liquid resource into a retentate and a filtrate. The retentate typically contains concentrated impurities, such as hydrocarbons, organic matter, and suspended solids, while the filtrate typically represents the purified liquid. This separation may be achieved through processes like membrane filtration, centrifugation, or the use of weir tanks. The retentate may include materials like sludge or concentrated brine, which require proper disposal or further treatment. The filtrate, on the other hand, is further purified and may be passed to critical-material extraction at 240, where valuable elements like lithium are selectively recovered.

In some embodiments, once the treatment regimen at 230 has been completed, the further-purified midstream-liquid resource, or filtrate, may be passed to critical-material extraction at 240. Step 230 ensures that the liquid resource is adequately prepared for the selective recovery of valuable materials, such as lithium, from the purified stream. By effectively removing pre-treatment chemicals, their by-products, and other contaminants, the treatment regimen enhances the efficiency and efficacy of the critical-material extraction process, leading to higher yields and purer end products.

Figure 3:
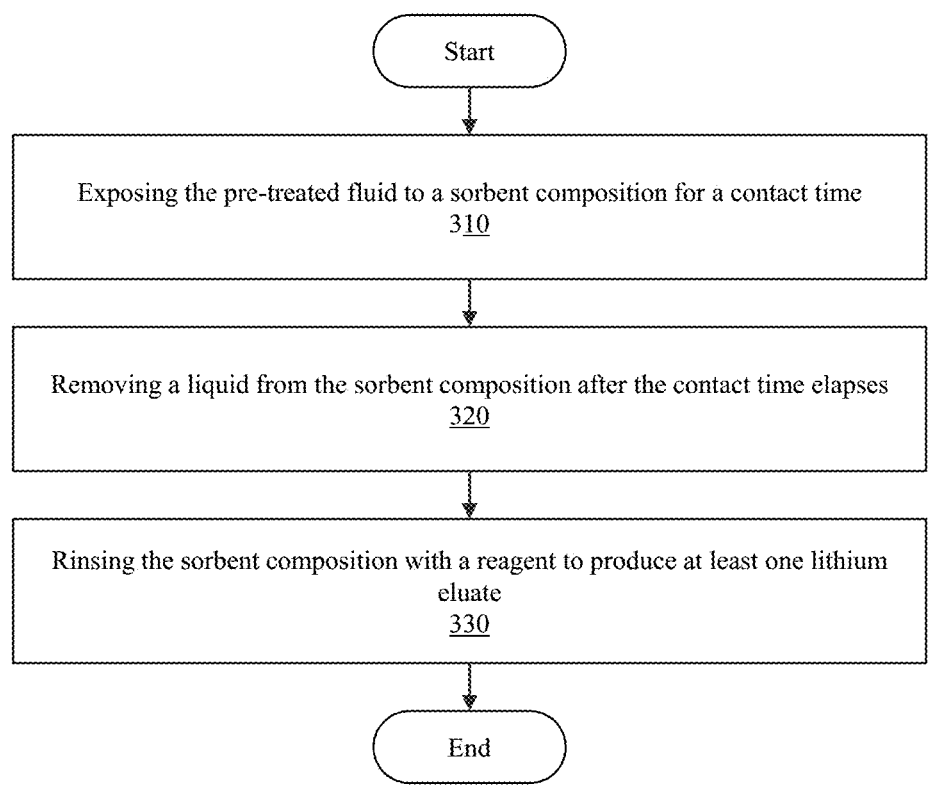
FIG. 3 is a flowchart illustrating the method for extracting a metal from a midstream liquid resource according to some embodiments of the present disclosure.

FIG. 3 is a flowchart that describes the method, according to some embodiments of the present disclosure. In some embodiments, at 310, the method may include exposing the pre-treated fluid to a sorbent composition for a contact time. At 320, the method may include removing a liquid from the sorbent composition after the contact time elapses. At 330, the method may include rinsing the sorbent composition with a reagent to produce at least one lithium eluate. Performing critical-material extraction may include steps 310 to 330.

In some embodiments, the sorbent composition may be one or more of a lithium manganese oxide (LMO), a lithium-manganese-oxide (LMO)-type lithium ion-sieve (LIS), a titanate sorbent, or an aluminate sorbent. Rinsing the sorbent composition further comprises concentrating an initial lithium concentration of the at least one lithium eluate to a lithium-cycle concentration between 100-500 ppm per cycle, thereby forming a lithium product in solution.

At 310, the method may include exposing the pre-treated fluid to a sorbent composition for a specified contact time. In some embodiments, the pre-treated fluid, having undergone initial treatments to remove hydrocarbons, organic matter, hydrogen sulfide, ions, and suspended solids, is now prepared for critical-material extraction. The sorbent composition used in this step may be selected based on its affinity for lithium and may include one or more of lithium manganese oxide (LMO), lithium-manganese-oxide (LMO)-type lithium ion-sieve (LIS), titanate sorbent, and aluminate sorbent. The contact time can be essential to ensure that lithium ions in the pre-treated fluid are effectively captured by the sorbent composition. The duration of the contact time may vary depending on factors such as the concentration of lithium in the fluid, the type and capacity of the sorbent used, and the desired efficiency of the extraction process.

At 320, the method may include removing the liquid from the sorbent composition after the contact time elapses. This step involves separating the now lithium-enriched sorbent from the remaining fluid. The separation process may employ various techniques such as filtration, centrifugation, or decantation, increasing the likelihood, or ensuring, that the sorbent, now containing the absorbed lithium ions, is efficiently isolated from the residual liquid. The removed liquid, which is now depleted of a significant portion of its lithium content, may undergo further processing or disposal depending on its composition and any remaining contaminants.

At 330, the method may include rinsing the sorbent composition with a reagent to produce at least one lithium eluate. This step can be crucial for recovering lithium from the sorbent. The rinsing process involves applying a reagent, which may be an acidic or basic solution, including acid or water, to desorb or exchange the lithium ions from the lithium-laden sorbent. The reagent serves to desorb the lithium ions from the sorbent, effectively transferring them into a solution known as the lithium eluate. In some embodiments, the reagent composition and the rinsing conditions are carefully controlled to maximize the concentration of lithium in the eluate. For illustrative purposes, in some embodiments the system may be modified to work with different types of sorbents. In some embodiments, the sorbent may be an aluminate sorbent, wherein the rinsing process involves applying a reagent such as fresh water, to desorb or exchange the lithium ions from the lithium-laden sorbent. In other embodiments, the sorbent may be an ion-exchange material such as a titanium-based, manganese-based, or polymer-based ion-exchange material. When using an ion-exchange material, the rinsing process involves applying a reagent, which may be an acidic or basic solution, including acid, to desorb or exchange the lithium ions from the lithium-laden sorbent. In either embodiment, the reagent serves to desorb the lithium ions from the sorbent, effectively transferring them into a solution known as the lithium eluate. In some embodiments, the reagent composition and the rinsing conditions are carefully controlled to increase or maximize the concentration of lithium in the eluate (e.g., reduce or minimize dilution by increasing or maximizing desorbing the lithium ions from the sorbent). For an aluminate sorbent, it may be desirable to use a higher pH solution or modify the contact time to increase the likelihood of or ensure efficient lithium desorption, given the sorbent's affinity for lithium under certain chemical conditions. These illustrative adjustments help maintain the efficacy of the process and increase the likelihood of, or ensure, a high recovery rate of lithium from the sorbent.

This process 330 may be repeated in cycles to concentrate the lithium to a desired level, typically between 100 and 500 ppm per cycle, thereby forming a lithium product in solution that is ready for further purification or use.

Returning to FIG. 1, removing oil and other chemicals may increase the period during which a sorbent composition, such as a spinel, can directly extract a desired metal in the metal-extraction step 110. The system 100 may be configured to process a volume of midstream-liquid resource measured in various volumes and may accommodate a variety of concentrations of metal. Accommodating a variety of concentrations of metals may be necessary when extracting metal from midstream-liquid resource, as the concentrations of metal fluctuate, sometimes predictably, over the life of a well. In some embodiments, the system may pre-process or otherwise pretreat the midstream-liquid resource 102 prior to the metal-extraction step 110). While midstream-liquid resource has been provided as one non-limiting example, the aforementioned principles are applicable to subsurface brines and liquid resources. In some embodiments, the continuous processing system 100, the liquid resource may be a natural brine, a dissolved-salt flat, seawater, concentrated seawater, a desalination effluent, a concentrated brine, a processed brine, an oilfield brine, a liquid from an ion-exchange process, a liquid from a solvent-extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

In some embodiments, the metal-extraction step 110 is aided by the use of a sorbent composition capable of extracting metals, for example metals in ionic form within the midstream-liquid resource. In some embodiments, a sorbent composition, for example an LMO sorbent greater than 100 microns, may be scaled up to accommodate volumes of produced wastewater over 10,000 barrels. While the present example details the use of a sorbent composition, smaller-format sorbents, doped sorbents, undoped sorbents, coated sorbents, uncoated sorbents, or combinations thereof may be used to adsorb a desired metal from the metal-containing fluid. Sorbent compositions may process more than 33,122 liters per contact with a thirty-minute contact time. Contact time may be varied depending upon the amount of desired metal to be extracted. The amount of desired metal may be arrived at using various methods, for example by the desired mass of recovered metal or as measured in the reduction of the concentration of the desired metal from the metal-containing fluid (e.g., a brine). Contact time also may be influenced by the extraction technology used.

The metal-extraction step 110 may use technology alternatives outside of format compositions (e.g., LMO sorbents) such as Electrochemical Extraction, Ionic Liquid Extraction, Membrane Technologies, Solvent Extraction, and Precipitation and Crystallization where the use of nanobubbles in these systems may aid the metal-extraction process. While several technologies have been discussed, different types of metal-producing waters and metals sought for extraction may necessitate the use of one or more of the aforementioned technologies. The system 100 may use batch-processing or continuous-processing techniques to run as many as forty eight (48) contacts prior to exhausting the sorbent composition. In some embodiments, the contact time may be tuned to account for the initial concentration of metal within the midstream-liquid resource 102 to increase the likelihood of, or to ensure, sufficient contact with the sorbent composition, e.g., an ion-exchange media, to remove the desired volume (or other units such as mass) of metal from the midstream-liquid resource. To perform the metal-extraction step 110, the system 100 may be configured with a monitoring system 104 to monitor the change of metal concentration. The monitoring system 104 may be equipped with a CPU, peripheral devices such as a temperature sensor, a pH sensor, or sensors of other chemical-properties-and-contents sensors that may be used to characterize the contents and nature of the midstream-liquid resource. In some embodiments, the monitoring system 104 may monitor the duration of the contact time, the contact time, the volume of midstream-liquid resource in the system, the count of elapsed contact times, the status of equipment (e.g., the health of equipment, a maintenance status, the active or inactive status of equipment), and visual and/or audible indicators to alert a user to act. The CPU may be connected to the internet or a local network to send status updates of the system. For example, as a sorbent composition or a sorbent approaches the end of its useful life, the CPU of the digital monitoring system may create an alert and transmit the alert to a user interface so the sorbent may be replenished at an appropriate time.

In some embodiments, the midstream-liquid resource is removed 106 during or after the metal-extraction step 110. In some embodiments, the midstream-liquid resource may be actively removed using an appropriate mechanism that sequesters the sorbent composition from the midstream-liquid resource. The removed midstream-liquid resource 106 may also be further processed to extract additional metals in a staged continuous-extraction process. In an alternative embodiment, the midstream-liquid resource may be transferred to another portion of the system 100 adapted to extract a second metal, pollutant, or to administer a treatment prior to returning the midstream-liquid resources for transport to an alternative site.

In some embodiments, the sorbent composition, laden with the metal, may undergo a first rinse step 49. In some embodiments, the rinse step 49 may use a rinsing agent, for example, fresh water, to remove remaining midstream-liquid resources from the sorbent composition. In some embodiments, a fresh-water rinsing agent of three hundred thirty one (331) liters may be used to ensure the sorbent composition is sufficiently free of midstream-liquid resources. In some embodiments, the properties of the sorbent composition may be used to separate the sorbent composition from the midstream-liquid resources in the rinse step 49. For example, removing the midstream-liquid resources 106 from the sorbent composition, such as an LMO, may involve applying a magnetic field to use the magnetic properties of the LMO to concentrate the sorbent composition for removal. In some embodiments, the rinsing step 50 may be aided by applying backpressure or a vacuum to the system. While discussed with respect to the rinse step 49, the described techniques may be applied to remove the sorbent composition from midstream-liquid resources, reagents, and any aqueous mediums used in the system 100.

Upon completion of the rinse 50, the fresh water may be removed and stored in a holding tank 52. In some embodiments, the rinsing agent may be processed to remove pollutants prior to returning the rinsing agent to a holding tank. In some embodiments, the holding tank 52 may be adapted to use back pressure or a vacuum. In some embodiments, the rinsing agent may be transferred to a reverse-osmosis unit 54 to remove the water for storage in a freshwater tank 56. The RO unit reject 58 may be removed from the system 100 in some embodiments. In some embodiments, the system 100 may include monitoring equipment to detect water levels in the freshwater tank 56 and may include a freshwater-reservoir source 59 to replenish the freshwater tank 56.

In some embodiments, the sorbent composition containing the metal of interest is exposed to a reagent 52 in an elution step 50. In some embodiments, the reagent 52 may be an acid, for example, hydrochloric acid (HCl) or sulfuric acid (H2SO4). In an embodiment in which the metal of interest is lithium, exposure of the sorbent composition to the reagent, for example, an acid like HCl, will produce LiCl, allowing the LiCl to be subsequently removed from the sorbent composition. While the synthesis of the metal salt lithium chloride has been provided, the acid may be varied to produce the metal salt of choice. For example, use of sulfuric acid ($H_2SO4$) may be a preferred reagent when the metal salt lithium sulfate ($Li_2SO4$) is desired. Of note, the reagent 52 may be mixed in various concentration levels. Once the metal has reacted with the reagent 52, a rinsing agent 142 may remove the desired metal from the sorbent. In some embodiments, the holding tank 52 may be adapted to use back pressure or a vacuum to support the removal of the desired metal from the sorbent. In some embodiments, the rinsing agent 52 is fresh water. Using fresh water as the rinsing agent allows the metal in its ionic form to be contained within the water. In some embodiments, the LiCl is concentrated within the rinsing agent.

In some embodiments, the direct metal-extraction process may continue by further processing the concentrated metal salt 144 created by the reverse-osmosis process 146 into an alternative chemical composition. In some embodiments, the metal salt 144 may be lithium chloride and a processing step 150 may convert the lithium chloride into lithium carbonate. In some embodiments, the processing step 150 may utilize conventional techniques for processing the metal salt to an alternative metal composition. See Canadian patent number CA 3158831 A1, titled "Production of Lithium Hydroxide and Lithium Carbonate" incorporated in its entirety by reference. Such techniques produce lithium carbonate from lithium chloride, water, and a carbon source. In some embodiments, the carbon source is provided by producing carbon-dioxide nanobubbles in the water.

In some embodiments, the system 100 may be delivered on site to extract metals in ionic form from a metal-containing fluid (e.g., one or more of a subsurface brine, midstream-liquid resources 102, and liquid resources). In such an embodiment, the system 100 may be placed on an easily shippable skid and placed onsite, allowing for a rapidly deployable and customizable solution for extracting metals that does not disrupt other onsite operations. In some embodiments, infrastructure, such as piping with optional valves, allow the metal-containing fluid to be received at a first vessel where the metal-extraction step 110 may be performed. When batch processing is used, the first vessel for performing the metal-extraction step 110 may include a valve for releasing metal-containing fluid from the first vessel once a cycle time of exposure to the sorbent composition, or conventionally sized sorbent/spinel, and nanobubbles has elapsed. The skid system 100 may also contain a second vessel containing a rinsing agent plumbed to the first vessel for performing the metal-extraction step 110.

Upon releasing the metal-containing fluid from the first vessel, the rinse step 49 may be performed, allowing the fluid to be washed from the large-formation composition, or conventionally sized sorbent/spinel. In some embodiments the skid system 100 may contain a third vessel plumbed to the first vessel for performing the metal extraction 110 and/or rinse step 49. The third vessel may contain a reagent. In some embodiments, the reagent stored within the third vessel is released into the first vessel to release the metal contained within the sorbent composition, or conventionally sized sorbent/spinel into a fluid containing the reagent (e.g., the elution step 50). The skid system 100 may be adapted for continuous or batch processing. In some embodiments, the skid system 100 includes at least plumbing and (sometimes necessary) fluid-storage vessels to complete a metal-extraction step 110, a rinse step 49, and an elution step 50. In some environments, a second rinse step 140 may not be needed. In some embodiments, the skid system 100 may be adapted with a forward-osmosis system (e.g., when draw solution is plentiful) or a reverse-osmosis system 845 (e.g., when fresh water is more scarce and on-site water recovery is desired to support direct metal extraction or other on-site needs).

In some embodiments, the skid system 100 may be further adapted to environmental conditions in other ways. For example, additional equipment may be co-located or otherwise installed on the skid to support the rinse step 50. A holding tank 52 may be connected to a forward-osmosis system (not shown in FIG. 1) or a reverse-osmosis system 146. In some embodiments, the forward-osmosis system or the reverse-osmosis system 146, may be plumbed to a freshwater tank 56. The freshwater tank 56 may be used to support the rinse step 50, and/or optionally provide a water source for a second rinse step 140. In some embodiments, the reverse-osmosis unit 54 may be augmented or replaced with a filtration system (e.g., a nanofiltration system, an ultrafiltration system, or another water-filtration system such as a distillation or deionization system) to clean the rinse of the rinse step 50.

In some embodiments, the system 100 is augmented or adapted at 146 with systems for further concentrating the metal-salt eluate 144. While the system 100 is depicted with a reverse-osmosis unit 146, in some embodiments, the reverse-osmosis unit may be replaced with or augmented with an industrial evaporator, such as one or more of the Saltworks™ product line of saltmaker evaporators. In an alternative embodiment in which energy sources are not plentiful, further concentrating the metal-containing eluate may be accomplished in an evaporation pond.

In some embodiments, the skid system 100 may be further adapted with equipment to convert a metal salt to an alternative chemical composition (e.g., lithium chloride to lithium carbonate). In some embodiments, the skid system 100 includes a nanobubbles pump for injecting carbon dioxide into an eluate containing the concentrated metal salt.

In some embodiments, the system 100 may include valves and equipment capable of being controlled by a monitoring system 104. The monitoring system 104 may contain a CPU having instructions for requesting sensor information collected by peripheral sensors and/or devices connected to the monitoring system 104. In some embodiments, peripheral sensors may be hardwired to the monitoring system 104 or wirelessly connected to the monitoring system 104. In some embodiments, wirelessly connected peripheral sensors and/or devices directly communicate through the wireless network to the monitoring system 104 and/or communicate through a network router to a local, remote, or otherwise cloud-based monitoring system 104.

The monitoring system 104 may track or otherwise sense the chemical properties of the midstream-liquid resources 102, detect the amount of sorbent in the metal-extraction step 110, and/or track the contact time of the midstream-liquid resources 102 with the sorbent. In some embodiments, the sensed information may be used to automatically start pumps or open valves used to remove the midstream-liquid resources 106. In some embodiments, the monitoring system 104 may selectively control a nanobubbles pump. For example, the nanobubbles pump may be activated, creating gas nanobubbles in the midstream-liquid resources or brine to increase the effectiveness of the sorbent to extract the metal. In some embodiments, the monitoring system 104 may be configured to utilize algorithms capable of improving, even optimizing, the use of nanobubbles for the extraction of the metal.

In some embodiments, the CPU further contains instructions for initializing the rinse step 50. In some embodiments, the monitoring system 104 may initialize the rinse step 50 upon detecting the removal of the midstream-liquid resources to a midstream-liquid-resources return 106. In an alternative embodiment, the monitoring system 104 may monitor the changing properties of the midstream-liquid resources 102 as the desired metal is extracted. For example, when lithium ions within the midstream-liquid resources 102 are sequestered within a sorbent composition, for example a large-format spinel of LMO, the pH of the midstream liquid resources becomes more acidic as the lithium-ion concentration decreases in the midstream liquid resources 102. Such a phenomenon, e.g., a changing property of the midstream-liquid resources 102, may be monitored by the monitoring system 104, and upon the changing property of the midstream-liquid resources 102 reaching a state indicative of an extraction level of the lithium ion, the midstream-liquid resources may be removed and the rinse step 50 initiated. For example, a volume of midstream-liquid resources containing 200 ppm levels of lithium may have an initial pH of 8.8. Upon reducing the ppm levels of lithium to roughly 13 ppm, the pH may become more acidic achieving a pH of 6.1. In an alternative embodiment, the monitoring system 104 may contain instructions that when executed by the CPU cause a magnetic field to be applied to a container where the metal-extraction step 110 has taken place. The activation of a magnetic field benefits from the inherent magnetic properties of certain sorbents and sorbent compositions. For example, the application of the magnetic field may attract a sorbent such as an LMO spinel to aggregate on a surface of the container when the produced-water return 106 receives a command/instruction to open.

In an embodiment in which the system 100 is placed on a mobile skid, the state information related to the metal-extraction step 110, the rinse step 50, and other activities such as the elution step 50, may be transmitted to remote users monitoring the extraction process depicted in FIG. 1.

In some embodiments, the monitoring system 104 may monitor the quality of the aqueous solution used to perform the rinse step 50. In some embodiments, nanobubble pumps may be activated to aid in a forward-osmosis process or reverse-osmosis process 54. The use of nanobubbles may accelerate the ability to separate the water from other chemicals present as a result of the rinse steps 50 and 140. Similarly, the monitoring system 104 may actively sense the presence of rinsing agents, the quality of the rinsing agents, the presence of the rinsing agents, the chemical composition of the rinsing agents, and the current state of the rinsing agents as indicated by one or more parameters of the rinsing agents such as a temperature, pressure, pH, and the like. Such information may be communicated to a user, for example, over a private local area network (LAN). In some embodiments, the monitoring system 104 may be adapted with an ethernet port, one or more cellular antennae, or other wireless communications equipment for transmitting and receiving status information to local and remote users.

In some embodiments, the monitoring system 100 may include instructions that when executed cause the release of a reagent 52 to the rinsed sorbent containing the metal of interest. The release may activate or otherwise open a valve separating a reagent tank (not depicted) from a tank where the elution step 50 takes place. In some embodiments, the rinse step 50 and elution step 50 occur in the same tank. The monitoring system 104 may contain sensors able to monitor the molar concentration of the reagent 52. In some embodiments, the system 100 may include multiple reagents tuned to the metal sought to be extracted from the sorbent. In some embodiments, the elution step 50 of the system 100 may be adapted with equipment for producing nanobubbles to speed up or otherwise enhance the elution step 50. In some embodiments, the monitoring system 100 may include instructions that when executed cause the nanobubble equipment to produce nanobubbles of different or varied gas types. In some embodiments, the monitoring system 104 may monitor the effectiveness of the nanobubbles in producing a metal salt, such as lithium chloride.

In some embodiments, the monitoring system 100 may include instructions that when executed cause the monitoring system to conduct a second rinse step 140. The second rinse step 140 may be initiated by releasing a rinsing agent 142. In some embodiments, the monitoring system 100 may include instructions that when executed cause the system to release a concentrated metal salt 144 to a reverse-osmosis station 146. At the reverse-osmosis station 146, nanobubbles may be used to enhance the ability of the reverse-osmosis (RO) equipment to recover the reverse-osmosis permeate, and to further concentrate the metal salt.

In some embodiments, the monitoring system 100 may include instructions that when executed cause the system to process 150 the metal salt 148 into an alternative composition containing the metal. In some embodiments, the system 100 may use conventional techniques, for example converting a concentrated lithium chloride 148 salt to a concentrated lithium carbonate. Conventional techniques generally produce lithium carbonate from lithium chloride, water, and a carbon source. In some embodiments, the carbon source is provided by transmitting a signal to cause nanobubble equipment to produce gas nanobubbles. In some embodiments, the produced gas nanobubbles are of carbon dioxide gas produced within the water containing the concentrated lithium chloride 148. In some embodiments, the system 100 causes the nanobubble equipment to produce gas nanobubbles into the concentrated lithium chloride 148 without the use of other techniques to produce lithium carbonate.

In some embodiments the system 100 may be fully automated, semi-autonomous, or manually operated. While the system 100 has been described with use of sorbent compositions for direct metal extraction, the nanobubble system may be applied throughout the metal-extraction process 110, the rinse step 50, and the elution step 50 in combination with other conventional direct-metal-extraction techniques. Similarly, several techniques may be used in conjunction with or instead of the aforementioned steps to separate the desired metal from the direct-extraction materials and/or rinsing agent. In some embodiments, the desired metal may be concentrated into the solution using one or more of forward osmosis, reverse osmosis, and selectively permeable membranes.

The exposure may occur at ambient temperature and ambient pressure. In some embodiments, the contact time allows the sorbent to make sufficient contact with the midstream-liquid resources, allowing the sorbent to sequester the metal from the produced-water volume. The contact time the midstream-liquid resources may be placed in contact with the sorbent may vary in time based on the reactivity of the sorbent and the constituents of the fluid. Sorbent compositions in which a metal ion may occupy a space will actively extract the metal faster as the statistical probability of a metal ion encountering an unoccupied space within the sorbent composition, e.g., an unoccupied space within a sorbent such as $Li1.33Mn1.67O4$ or $Li4Mn5O12$, is greatest when clean sorbent composition comes in contact with the metal ion. In some embodiments, the midstream-liquid resources may have a reduced first contact time to quickly extract the desired concentration from the midstream-liquid resources. The midstream-liquid resources may then be transferred to a second station for batch processing where the contact time is fine-tuned to "finish" the extraction process.

When enough time has elapsed for the metal to have been removed from the midstream-liquid resources such that a desired concentration of metal within the midstream-liquid resources has been extracted, at the rinse step 50, the method may include removing the midstream-liquid resources from contact with the sorbent. Once a desired amount of midstream-liquid resources has been removed, at the elution step 50, the method may include rinsing the sorbent. After rinsing the sorbent, at the rinse step 140, the method may include exposing the rinsed sorbent to a reagent to produce at least one metal eluate.

In some embodiments, exposing the volume of midstream-liquid resources to a sorbent for a contact time 110 may be accomplished by batch processing the volume of midstream-liquid resources with the sorbent for the contact time. In some embodiments, batch processing the volume of midstream-liquid resources with the sorbent for the contact time further comprises mixing the volume of midstream-liquid resources with the sorbent for the contact time. In some embodiments, batch processing the volume of midstream-liquid resources with the sorbent for the contact time further comprises testing a concentration level of the at least one metal. In some embodiments, batch processing may be conducted in industrial equipment. In some embodiments, the equipment may be augmented with agitators and other mixing components and techniques to increase the opportunities for the sorbent to come in contact with the volume of midstream-liquid resources.

The contact time may be calculated, although, in some embodiments, the contact time may be based on a direct or an indirect measurement of the change in metal concentration within the system. In some embodiments, batch processing the volume of midstream-liquid resources with the sorbent for the contact time may further comprise testing an indication of a concentration level of the at least one metal using various suitable detection methods. Non-limiting examples of such detection methods include Micro Plasma Induced Breakdown Spectroscopy (MIBS) or Laser Induced Breakdown Spectroscopy (LIBS), both of which are capable of providing real-time, in-situ analysis of metal concentrations. Other suitable methods may include Inductively Coupled Plasma Mass Spectrometry (ICP-MS), which offers high sensitivity for detecting trace metals, Atomic Absorption Spectroscopy (AAS) for quantifying specific metal ions, or Ion Chromatography (IC) analysis, which is effective for rapid elemental analysis. These methods can be employed individually or in combination or subcombination to ensure accurate detection and quantification of the desired metal within the midstream-liquid resource, thereby enhancing or optimizing the subsequent extraction processes. In some embodiments, testing an indication of a concentration level of the at least one metal includes testing a pH level of the midstream-liquid resources. In some embodiments, exposing the volume of midstream-liquid resources to a sorbent for a contact time may further comprise continuous processing the volume of midstream-liquid resources with the sorbent for the contact time. Continuous processing may be monitored to increase the likelihood of or to ensure metal extraction occurs at the desired levels.

In some embodiments, continuous processing of the volume of midstream-liquid resources with the sorbent for the contact time further comprises testing a concentration level of the at least one metal. In some embodiments, batch processing the volume of midstream-liquid resources with the sorbent for the contact time further comprises testing an indication of a concentration level of the at least one metal. In some embodiments, testing an indication of a concentration level of the at least one metal further comprises testing a pH level of the midstream-liquid resources.

In some embodiments, testing an indication of a concentration level of the at least one metal further comprises testing a flow rate of the midstream-liquid resources. In some embodiments, the sorbent may be a metal-oxide sorbent. In some embodiments, the metal-oxide sorbent may be doped. In some embodiments, the metal-oxide sorbent may be doped with an ion doping agent.

In some embodiments, an ion dopant may further comprise an ion doping agent. For a nonlimiting example of an ion doping agent, see Guotai Zhang, et al. "Al and F Ions Co-Modified li1.6mn1.6o4 with Obviously Enhanced Li+ Adsorption Performances," Chemical Engineering Journal, Elsevier, 5 Jul. 2022, https://www.sciencedirect.com/science/article/abs/pii/S1385894722033988, this publication hereby being incorporated in its entirety by reference. In some embodiments, the metal-oxide sorbent may be a manganese-oxide-based sorbent. In some embodiments, the manganese-oxide-based sorbent may be doped. In some embodiments, the metal-oxide sorbent may be a manganese-oxide-based sorbent that may further comprise a lithium manganese oxide (LMO). For a discussion of lithium manganese oxides (LMOs) in conjunction with direct lithium extraction (DLE) based on the chemistry of the midstream-liquid resources, see Calvo, Ernesto. (2021), Direct Lithium Recovery from Aqueous Electrolytes with Electrochemical Ion Pumping and Lithium Intercalation, ACSO mega, 10.1021/acsomega.1c05516, which is hereby incorporated in its entirety by reference. In some embodiments, the metal-oxide sorbent may be a manganese oxide-based sorbent that may further comprise a lithium-manganese-oxide (LMO)-type lithium ion-sieve (LIS).

In some embodiments, the lithium manganese oxide (LMO) may be doped. In some embodiments, the metal-oxide sorbent may be a titanate sorbent. In some embodiments, the titanate sorbent may be doped. In some embodiments, the metal-oxide sorbent may be an aluminate sorbent such as LiClAl2(OH)6nH2O. In some embodiments, the aluminate sorbent may be doped. In some embodiments, the contact time may be a function of at least the volume of midstream-liquid resources, a sorbent surface area, or a desired extraction of the concentration of metal from the volume of midstream-liquid resources.

In some embodiments, the at least one metal may be an alkali metal. In some embodiments, the alkali metal may be lithium. In some embodiments, the lithium from the volume of midstream-liquid resources may be at an initial concentration equal to or less than or equal to fifty (50) ppm. In some embodiments, the lithium from the volume of midstream-liquid resources may be at an initial concentration equal to or less than fifty (50) ppm and greater than or equal to three (3) ppm.

In some embodiments, the lithium from the volume of midstream-liquid resources may be at an initial concentration equal to or less than one hundred (100) ppm. In some embodiments, the contact time may be a function of at least the volume of midstream-liquid resources, the mass of sorbent, or a reduction in an initial pH of the midstream-liquid resources to a final pH of the midstream-liquid resources. In some embodiments, an initial pH of the midstream liquid resources may be a pH less than or equal to ten (10.0) and greater than or equal to a pH of five (5.0).

In some embodiments, a final pH of the midstream-liquid resources may be greater than or equal to a pH of five (5.0). In some embodiments, the volume of midstream-liquid resources is exposed to the sorbent during the contact time. In some embodiments, the at least one metal from the volume of midstream-liquid resources may be an alkali metal. In some embodiments, the alkali metal from the volume of midstream-liquid resources may be lithium.

In some embodiments, an initial concentration of the lithium from the volume of midstream-liquid resources may be less than or equal to fifty (50) ppm and greater than or equal to ten (10) ppm. In some embodiments, an initial concentration of the lithium from the volume of midstream-liquid resources may be greater than or equal to ten (10) ppm. In some embodiments, the method may include receiving the volume of midstream-liquid resources. In some embodiments, the volume of midstream-liquid resources may be received untreated from an oil-producing well.

In some embodiments, the volume of midstream-liquid resources may be received untreated from an oil-producing well. In some embodiments, the volume of midstream-liquid resources is pre-treated prior to exposing the volume of midstream-liquid resources to a sorbent for a contact time. In some embodiments, pre-treating the volume of midstream-liquid resources prior to exposing the volume of midstream-liquid resources to a sorbent for a contact time further comprises applying, to the midstream-liquid resources, one or more of a mechanical filter, a chemical filter, or a magnetic separation.

In some embodiments, rinsing the sorbent after the contact time elapses further comprises rinsing the sorbent with fresh water after the contact time. In some embodiments, the method may include returning the fresh water to one or more holding tanks. In some embodiments, the method may include performing reverse osmosis on the returned fresh water. In some embodiments, exposing the rinsed sorbent to a reagent to produce at least one metal eluate further comprises exposing the rinsed sorbent to an aqueous acid solution.

In the context of releasing lithium from a sorbent, various reagents and mechanisms can be employed depending on the specific system and desired outcomes. Commonly used acids include hydrochloric acid (HCl) and sulfuric acid (H2SO4), which are effective in eluting lithium due to their strong acidic properties. Additionally, nitric acid (HNO3) may be used in cases where strong oxidizing conditions are necessary. Weaker acids such as acetic acid (CH3COOH) and citric acid (C6H8O7) can also be utilized for gentler elution processes, particularly in systems where organic-acid compatibility is required. Beyond acids, ammonium hydroxide (NH4OH) can serve as a reagent when combined with other chemicals to facilitate lithium-ion release. In aluminate sorbents, fresh water is used to desorb the lithium from the body of the sorbent. Other methods include thermal desorption, where heating the sorbent releases lithium without the need for chemical reagents, and electrochemical desorption, where an electrical current is used to desorb lithium ions, particularly in systems designed for electrochemical applications.

In some embodiments, producing a metal-chloride eluate further comprises producing a lithium-chloride eluate. In some embodiments, producing a lithium-chloride eluate further comprises removing the lithium-chloride eluate from the rinsed sorbent. In some embodiments, after producing a lithium-chloride eluate by removing the eluate from the rinsed sorbent, the lithium-chloride solution may undergo further processing to convert it into a economically desirable form such as lithium carbonate. This conversion can be achieved through a series of chemical reactions. For instance, the lithium-chloride eluate may be treated with sodium carbonate (Na2CO3) to precipitate lithium carbonate (Li2CO3), a compound commonly used in various industrial applications, including the production of lithium-ion batteries. In some embodiments, the reaction may involve heating the lithium-chloride solution with sodium carbonate under controlled conditions, leading to the formation of lithium-carbonate precipitate, which then can be filtered, washed, and dried to obtain a high-purity lithium carbonate product suitable for commercial sale. Additionally, alternative conversion methods may involve using lithium hydroxide (LiOH) as an intermediary product, depending on the specific market requirements and intended application of the lithium product. This approach allows for flexibility in the production process, increasing the likelihood or ensuring that the final lithium product meets industry standards and customer specifications.

In some embodiments, the method may include receiving the volume of midstream-liquid resources. In some embodiments, receiving the volume of midstream-liquid resources further comprises receiving the volume of midstream-liquid resources at a wellhead, a saltwater disposal well, a produced-water storage facility, a retention pond, a frac pond, a flowback-fluid collection site, a retention pond, a holding tank, a holding pond, a pump station, a frac tank, or a water-midstream infrastructure site.

In some embodiments, receiving the volume of midstream-liquid resources further comprises pre-treating the midstream-liquid resources. In some embodiments, the volume of midstream-liquid resources further comprises pre-treated midstream-liquid resources. In some embodiments, pre-treating the midstream-liquid resources further comprises running the volume of midstream-liquid resources through a mechanical filter.

In some embodiments, pre-treating the midstream-liquid resources further comprises running the volume of midstream-liquid resources through a chemical filter. In some embodiments, pre-treating the midstream-liquid resources further comprises applying, to the midstream-liquid resources, a multiphase separator. In some embodiments, pre-treating the midstream-liquid resources further comprises applying, to the midstream-liquid resources, at least one of a heat treatment, gravity separation, centrifugal separation, nut shell filtration, and electrochemical separation.

In some embodiments, pre-treating the midstream-liquid resources further comprises applying, to the midstream-liquid resources, a chemical demulsifier. In some embodiments, pre-treating the midstream-liquid resources further comprises applying, to the midstream-liquid resources, a magnetic-separation treatment. In some embodiments, pre-treating the midstream-liquid resources further comprises applying, to the midstream-liquid resources, a magnetic-separation treatment. In some embodiments, pre-treating the midstream-liquid resources further comprises applying, to the midstream-liquid resources, at least one of a dissolved-air flotation, a suspended-air flotation, a diffused-air flotation, or an oxygen-induced air flotation.

In some embodiments, pre-treating the midstream-liquid resources further comprises applying, to the midstream-liquid resources, an oil skimmer. In some embodiments, pre-treating the midstream-liquid resources may further comprise plasma treating the volume of midstream-liquid resources. In some embodiments, pre-treating the midstream-liquid resources further comprises removing, from the midstream-liquid resources, at least one of a solid, oil, or $H_2S$.

In some embodiments, pre-treating the midstream-liquid resources further comprises precipitating an iron-containing compound. In some embodiments, pre-treating the midstream-liquid resources further comprises adsorbing sodium from the midstream-liquid resources. In some embodiments, the method may include receiving the volume of midstream-liquid resources at a weir tank.

In some embodiments, a metal being extracted from the midstream volume may be a compound containing, or an ionic form of, at least one of silver, aluminum, gold, boron, beryllium, bismuth, bromine, calcium, cadmium, chromium, cobalt, or copper, manganese, magnesium, potassium, vanadium, or strontium.

Figure 4:
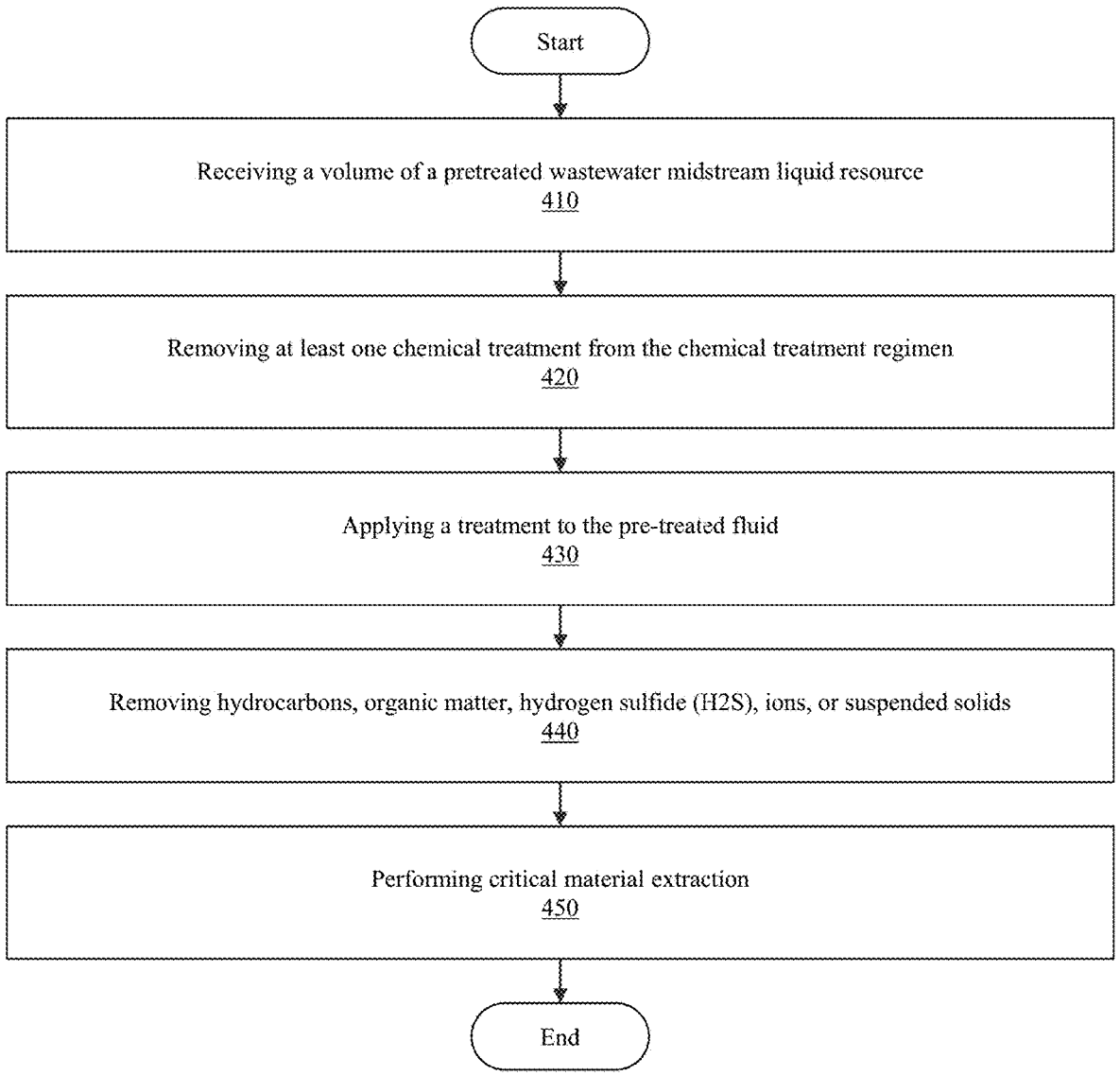
FIG. 4 is a flowchart illustrating a method for enhancing or optimizing extraction of lithium, according to some embodiments of the present disclosure.

FIG. 4 is a flowchart that describes a method for enhancing or optimizing extraction of lithium, according to some embodiments of the present disclosure. In some embodiments, at 410, the method may include receiving a volume of a pretreated midstream-liquid resource (e.g., a pretreated wastewater midstream-liquid resource) from a pipeline, a tank, a midstream recycling facility, or a desalination site.

At 420, the method may include removing at least one chemical treatment from the chemical treatment regimen from the volume of the pretreated midstream-liquid resource. Removing at least one chemical treatment from the chemical-treatment regimen 420 may involve using a mechanical filter. Non-limiting examples of types of mechanical filters include, but should not be limited to, sand filtration, bag filtration, cartridge filtration, disc filtration, membrane filtration, media filtration, activated carbon filtration, ceramic filtration, ultrafiltration, or nanofiltration.

In the pre-treatment process 420, these filters may be employed to remove various contaminants and chemical residues from the wastewater midstream-liquid resource. For example, sand filtration utilizes layers of sand to trap and remove particulates, often serving as a primary filtration step in desalination plants. Bag and cartridge filtration systems are commonly used in produced-water recycling facilities to remove larger particles and debris before the water undergoes further treatment. Disc filtration provides high-efficiency filtration by using a series of stacked discs that trap particles as water flows through, making disc filtration suitable for applications requiring compact filtration units.

Membrane filtration, including ultrafiltration and nanofiltration, employs semipermeable membranes to separate smaller particles and dissolved contaminants. Ultrafiltration can remove suspended solids and macromolecules, while nanofiltration targets smaller dissolved substances, including some salts and organic molecules. Media filtration, such as activated-carbon filtration, is effective for adsorbing organic contaminants and residual chemicals from the pretreated fluid. Ceramic filtration systems offer durability and high-temperature resistance, making them suitable for environments with extreme conditions. Each of these mechanical filters plays a role in ensuring that the treated-liquid resource is adequately purified before further processing, such as critical-material extraction or other downstream treatments. In some embodiments, one treatment process 420 is applied. In some embodiments, multiple treatment processes 420 may be applied to the midstream-liquid resource in a treatment regimen.

After the initial mechanical pre-treatment process 420 has been applied to the wastewater midstream-liquid resource, various residuals may still remain, necessitating further treatment or disposal. These residuals can include trace amounts of the chemical treatments themselves, such as oxidizers, coagulants, or flocculants that were not fully removed during the treatment process. Organic contaminants, including residual hydrocarbons, natural organic matter, or organic acids, might also persist. Additionally, suspended solids that were not completely filtered out, such as fine-particulate matter, emulsified oils, or colloidal particles, can remain in the treated liquid. Dissolved ions, including trace metals or salts, also may be present if not entirely captured by ion-exchange resins or membranes during the treatment. The presence of these residuals highlights the need for additional polishing or secondary treatments to increase the likelihood that or to ensure the treated liquid meets the desired purity standards before being reused or disposed of.

While removing at least one chemical treatment from the chemical treatment regimen 420 has been described with respect to mechanical-filtration processes, other examples of chemical removal include ion exchange, adsorption using activated carbon or other media, biological degradation through bioreactors, chemical precipitation, electrochemical treatments, advanced oxidation processes, distillation, membrane-separation techniques such as reverse osmosis or nanofiltration, and solvent extraction. These methods can be used independently or in combination to effectively reduce or eliminate unwanted chemicals from the pre-treated fluid, thereby enhancing the efficiency and effectiveness of the subsequent treatment stages.

At 430, the method may include applying a treatment to the pre-treated fluid. When applying a treatment 430 to the pre-treated fluid 420, certain residuals may remain in the fluid. For illustrative purposes, the pre-treatment regimen 420 includes the application of a biocide and a weir tank. The biocide may reduce bacterial content but could leave behind byproducts of the microbial-degradation process, including organic compounds and inactivated cells. The weir tank, primarily functioning to separate immiscible liquids and heavier suspended solids, may still allow finer suspended solids, emulsified oils, or dissolved organic matter to pass through. Additionally, chemical residues from the biocide itself, along with any colloidal particles, minor oil fractions, and dissolved salts, may persist in the pre-treated fluid. Therefore, applying a treatment 430 following the pre-treatment regimen might need to address these remaining contaminants to increase the likelihood that or ensure the fluid is adequately prepared for critical-material extraction or further processing.

Following the steps referenced as 420 and 430, at 440, the method may involve removing hydrocarbons, organic matter, hydrogen sulfide ($H_2S$), ions, or suspended solids from the pre-treated fluid. Removing hydrocarbons, organic matter, hydrogen sulfide (H2S), ions, or suspended solids 440 may further purify the midstream-liquid resource prior to performing critical-material extraction 450. Removing hydrocarbons 440 reduces the risk of fouling in downstream equipment, while eliminating organic matter and suspended solids helps prevent clogging and enhances the efficiency of separation processes. Hydrogen-sulfide removal mitigates corrosion risks and reduces the presence of sulfur compounds that could interfere with chemical treatments or extraction processes. The removal of ions, particularly those that could form scale or interact negatively with other chemicals, increases the likelihood that or ensures the fluid is optimally conditioned for any further processing. This step may utilize a combination of mechanical, chemical, or electrochemical techniques to achieve the desired level of purification.

In some embodiments, removing hydrocarbons, organic matter, hydrogen sulfide, ions, or suspended solids from the pretreated volume of a midstream-liquid resource further comprises applying a mechanical treatment further comprising at least one of a media filtration, bag filtration, cartridge filtration, a ceramic filtration, ceramic ultrafiltration, ceramic nanofiltration, or a divalent filtration system, membrane filtration system, dissolved-air flotation (DAF), suspended-air flotation (SAF), weir tank, media bed, membrane, centrifuge, clarifier, and hydrocyclone.

At 450, the method may include performing critical-material extraction. The volume of the pretreated midstream-liquid resource may have been treated with a chemical treatment regimen. At 450, the method may include performing critical-material extraction using the Critical Material Extraction (CME) system 450. The CME system 450 may encompass various techniques tailored to the specific metal of interest and the composition of the pre-treated fluid. Examples of CME systems that may be employed include ion-exchange systems, where ion-exchange resins or media selectively remove metal ions such as lithium from the pre-treated fluid by exchanging them with other cations present in the system. Another example is solvent extraction, which involves the use of an organic solvent that selectively binds to metal ions, allowing their separation from the aqueous phase. Membrane-based separation systems, including nanofiltration and reverse osmosis, can also be used within the CME system 450 to concentrate metal ions, utilizing lithium-selective membranes to facilitate the extraction of lithium from complex brine solutions. Additionally, electrochemical extraction within the CME system 450 may use an electric field to drive metal ions through a selective membrane or onto an electrode surface, enabling the accumulation of the metal for subsequent harvesting. Lastly, adsorption on sorbents may be employed, where metals such as lithium are selectively adsorbed onto sorbent materials like aluminate based sorbents such as aluminum hydroxide ($Al(OH)_3$) or lithium-aluminum-layered double-hydroxide (LDH) sorbents, with the metal being desorbed or rinsed off using a suitable reagent such as fresh water. In some embodiments, the sorbent composition may be one or more of $Li_2MnO_3$, $Li_4Ti_5O_{12}$, $Li_4Mn_5O_{12}$, $LiMn_2O_4$, $Li_{1.6}Mn_{1.6}O_4$, $LiTiO_2$, $LiaTiO_4$, or $Li_7Ti_{11}O_{24}$. These diverse approaches within the CME system 450 can provide versatile and effective tools for the extraction of critical materials in various industrial processes.

At 450, the method may include performing critical-material extraction using the Critical Metal Extraction (CME) system 450. This system may incorporate a variety of techniques specifically designed to target and extract critical materials from the pre-treated fluid. Non-limiting examples of these extraction techniques include Direct Lithium Extraction (DLE), which may involve processes such as ion exchange, adsorption, or membrane-based separation to selectively remove lithium ions from brines or other liquid resources.

Another non-limiting example is Vanadium Extraction, where techniques like solvent extraction or ion exchange 450 can be employed to isolate vanadium from midstream-liquid resources or other industrial effluents. In a still further non-limiting example, Direct Cobalt Extraction may utilize similar solvent extraction or adsorption methods, focusing on selectively isolating cobalt from complex mixtures found in wastewater or brine solutions. Lastly, Direct Nickel Extraction could be achieved using electrochemical processes or selective precipitation techniques, enabling the recovery of nickel from midstream-liquid resources that contain dissolved metals.

When performing critical material extraction 450, the system is designed to operate following the removal of pre-treatment chemicals and their byproducts 430, as well as the application of subsequent treatment regimens 440. These steps 420, 430, and 440 serve to purify the midstream-liquid resource, which contains the critical material of interest, to a level that enables efficient commercial-scale CME. In some embodiments, steps 420 may not be needed. In another embodiment, steps 430 and 440 may be performed at a desalination plant or a transfer station prior to step 450. While numerous examples have been described, the chemical constituents and physical properties of the water may dictate the use of different combinations of steps 420, 430, and 440 prior to the CME step 450. In some embodiments, the purification process increases the likelihood or ensures that the midstream-liquid resource is free from contaminants that could interfere with the extraction processes, such as Direct Lithium Extraction (DLE), Vanadium Extraction, Direct Cobalt Extraction, or Direct Nickel Extraction. These processes, often essential for the recovery of valuable critical materials, are made viable on a commercial scale due to the rigorous pre-treatment and purification steps 420, 430, and 440 that precede the CME. This approach maximizes resource recovery while minimizing potential disruptions caused by residual impurities in the liquid resource.

Figure 5:
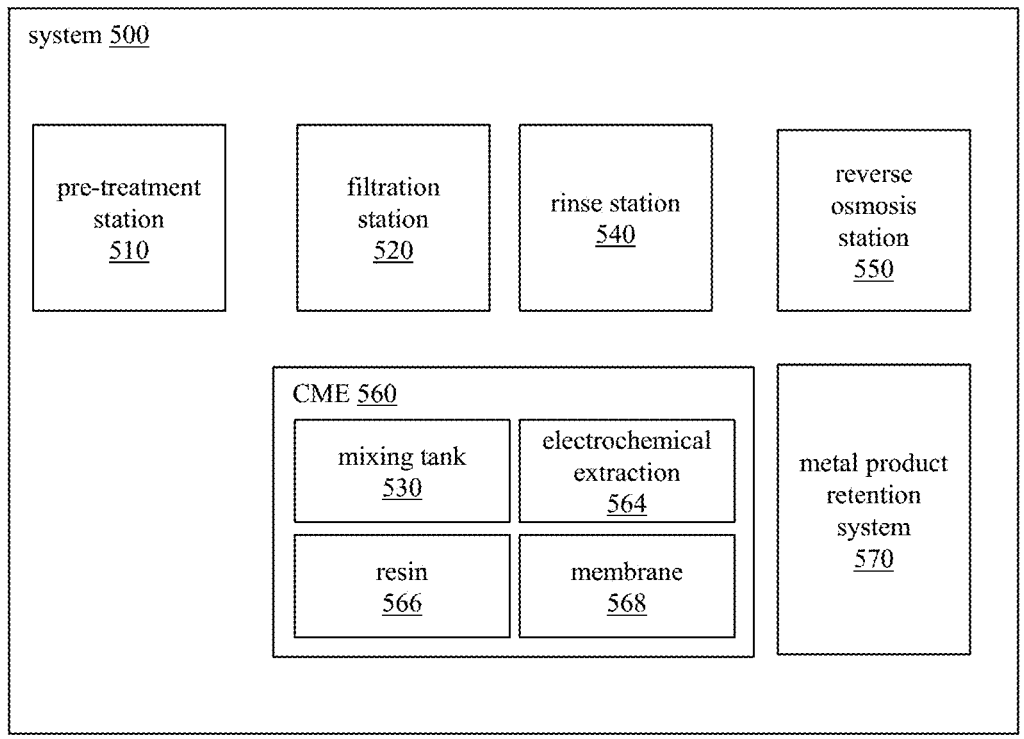
FIG. 5 is a block diagram illustrating a system for enhancing or optimizing extraction of a metal, according to some embodiments of the present disclosure.

FIG. 5 is a block diagram that describes a system 500, according to some embodiments of the present disclosure. In some embodiments, the system 500 may include several key components and stations designed to enhance or to optimize the extraction of lithium from a liquid resource. In some embodiments, the methods and systems 500 described herein for Critical Material Extraction (CME) may utilize Direct Lithium Extraction (DLE) systems similar to those disclosed in U.S. Non-Provisional Utility patent application Ser. No. 18/601,898, filed on Mar. 11, 2024, and entitled 'USE OF SORBENT COMPOSITIONS WITH NANOBUBBLES IN PRODUCED WATER APPLICATIONS,' the contents of which are incorporated herein by reference in their entirety.

At 510, the method may include a pre-treatment station to receive a volume of midstream-liquid resource from a pipeline, tank, or disposal site. This pre-treatment station may be critical for preparing the wastewater for further processing. The pre-treatment may involve applying various biocides such as oxidizers (e.g., hydrogen peroxide, ozone), glutaraldehyde, quaternary ammonium compounds (QUATs), DBNPA, or THPS to reduce microbial contamination. The treatment also may aim to separate the volume into a retentate and a filtrate. The filtrate, after pre-treatment, typically has a turbidity of less than 20 Nephelometric Turbidity Units (NTU), Total Suspended Solids (TSS) of less than 200 mg/L, a positive Oxidation-Reduction Potential (ORP), and an iron content of less than five (5) mg/L.

At 520, the system includes a filtration station to receive the pre-treated fluid. This station is designed to further remove impurities from the fluid. The filtration may involve multiple stages such as media filtration, cartridge filters, bag filters, disc filters, or membrane filtration. Membrane-filtration technologies, including microfiltration, nanofiltration, ultrafiltration, or divalent-rejection membranes, can be essential components in the treatment and purification processes in various industries, including metal-extraction technologies like those used in and/or that accompany direct-lithium-extraction (DLE) systems. These membranes are part of a broader class of filtration technologies that are distinguished by their pore sizes and their ability to separate different types of particles and solutes from liquids.

Microfiltration has larger pore sizes (typically 0.1 to ten (10) microns) and is used primarily for removing suspended solids, bacteria, or some larger organic molecules.

Ultrafiltration offers smaller pore sizes (typically 0.01 to 0.1 microns) and is effective at removing proteins, colloids, and other macromolecules.

Nanofiltration falls between ultrafiltration and reverse osmosis, with pore sizes typically in the range of one to ten (1-10) nanometers, and is used for removing small organic molecules and divalent ions like calcium and magnesium.

Divalent rejection membranes are specialized membranes designed to selectively reject divalent ions while allowing monovalent ions like sodium and lithium to pass through, making them particularly relevant in lithium-extraction processes.

An aim is to remove hydrocarbons, organic matter, hydrogen sulfide, ions, or suspended solids. Filtration methods may include dissolved-air flotation (DAF), suspended-air flotation (SAF), and weir tanks to increase the likelihood of, or to ensure, the removal of fine particulates and emulsified oils. In some embodiments, the station may employ chemical treatments such as flocculants and coagulants to enhance the removal process. Such processes result, at least from the perspective of a Critical Material Extraction, in achieving a pre-treated liquid In an embodiment, the system 500 is configured for treating a midstream-liquid resource and extracting critical materials by sequestering a desired metal from the pre-treated midstream-liquid resource. In some embodiments, the midstream-liquid resource is first treated at a pre-treatment station 510 and subsequently received at a mixing tank 530. The pre-treated fluid is then directed to the critical material extraction (CME) system 560, and the mixing tank 530. In some embodiments, the mixing tank 530 may contain a sorbent composition for sequestering the desired metal from the pre-treated midstream liquid resource. Desired metals that may be isolated include, but are not limited to, Aluminum, Magnesium, Potassium, Bromine, Boron, Calcium, Strontium, or Rare Earth Elements (REEs).

The mixing tank 530 is designed to hold the pre-treated fluid and facilitate the interaction with sorbent compositions such as lithium manganese oxide (LMO), lithium manganese oxide-type lithium ion-sieve (LIS), titanate sorbents, or aluminate sorbents, thereby enabling the material-extraction process within the CME system. Non-limiting examples of aluminate sorbents include a crystalline lithium salt aluminate, a lithium aluminum intercalate, LiCl·2Al(OH)3, aluminum trihydroxide (Al(OH)3), gibbsite, beyerite, alumina hydrate, bauxite, activated alumina layered lithium-aluminum double hydroxides (LDHs), LiAl2(OH)6Cl. The sorbent compositions may be selectively doped to optimize performance based on the specific attributes of the desired metal. Doping agents may be chosen to extend the number of cycles the sorbent composition can withstand when exposed to the midstream-liquid resource or to increase the sorbent's loading capacity or speed. Non-limiting examples of doping agents include $Mg^{2+}$, $Sn^{2+}$, $Zn^{2+}$, $Al^{3+}$, $Cr^{3+}$, $Sn^{4+}$, $Zr^{4+}$, $Ru^{4+}$, $V^{5+}$, or $Nb^{5+}$.

The material-extraction process isolates the desired metal into a retentate within the material-retention system, while the remaining filtrate is directed to a midstream-release system, enabling further processing or disposal. Following the absorption process, the mixing tank 530 may be rinsed to recover the desired metal. The rinsing agent, stored within a rinse station 540, may vary depending on the specific sorbent composition and the desired metal. Common rinsing agents stored within a rinse station 540 include water, impurities, or organic solvents like ethanol or methanol. The rinsing process allows the desired metal to be eluted from the sorbent, forming a metal-rich solution. In some embodiments, prior to desorbing the desired metal from the sorbent composition, the rinse station releases water into the mixing tank 530. In some embodiments, the rinse station rinses the sorbent composition with water to remove any impurities from the mixing tank 530 and sorbent composition that may be lingering when the filtrate is removed from the mixing tank 530. In some embodiments the rinse is retained as some of the desired metal may be desorbed from the sorbent composition during the rinse step. The rinse may be received at a reverse osmosis station 550 where the water from the rinse may be removed, and desired metal more fully concentrated, for example via reverse osmosis, forming a metal-rich product in solution, such as a lithium product in solution.

For illustrative purposes, in some embodiments the desired metal is lithium. In some embodiments, during the contact time, lithium ions from the midstream-liquid resource are adsorbed within the sorbent composition. The mixing tank 530 increases the likelihood or ensures that the conditions are optimal for increased or maximum lithium transfer, such as maintaining the appropriate pH, temperature, or level of agitation to enhance or optimize the sequestration of lithium within the sorbent composition. While described as a mixing tank 530, any vessel that may accept a pre-treated midstream-liquid resource, hold a sorbent composition, or be adapted to hold a sorbent composition, and release the pre-treated fluid once a specified contact time elapses qualifies as a mixing vessel.

While the CME 560 has been described with a mixing tank 530 and a sorbent composition, the CME 560 may be adapted with other metal-extraction systems or combinations of systems and post-absorption treatments. Non-limiting examples of such systems include electrochemical extraction systems 564, resin-based systems 566, and membrane-based systems 568. These alternative extraction systems can be particularly useful when the pre-treated midstream liquid resource contains lithium, as they provide different mechanisms for isolating and concentrating lithium from the solution.

In some embodiments, the system 500 may include a reagent station 540, which houses and delivers specific reagents to facilitate the metal desorption process. The reagent station 540 can dispense various chemical solutions, including acid-based reagents (e.g., HCl, $H_2SO_4$), or complexing agents, which interact with the sorbent composition to enhance metal recovery from the sorbent. In some embodiments, the reagent includes several constituents, such as an acid like $H_2SO_4$ to desorb the metal from the sorbent composition and a complexing agent that can form a complex with metal ions by binding to them through multiple sites on the agent, creating a more stable metal complex. In some embodiments, the reagent station 540 may dose the sorbent composition with one or more reagents in parallel or series. Additionally, the reagent station 540 may include desorption monitoring and dosing systems to ensure precise reagent application or metal desorption, thereby optimizing the efficiency of the metal-extraction process and potentially reducing operating costs of the system 500.

The material-extraction process isolates the desired metal into a retentate within the material-retention system, while the remaining filtrate is directed to a midstream-release system, enabling further processing or disposal of the filtrate.

In some embodiments, the electrochemical extraction system 564 may utilize processes such as electrolysis, where lithium ions in the pre-treated midstream-liquid resource are driven towards an electrode by an applied electric current. This process results in the accumulation of lithium at the electrode, allowing for its extraction and concentration. Non-limiting examples of electrochemical extraction systems include those utilizing lithium-selective electrodes or specialized electrochemical cells designed to enhance lithium recovery through controlled electrical fields and chemical gradients.

Similarly, resin-based systems 566 may employ ion-exchange resins that are selectively permeable to lithium ions. As the pre-treated midstream-liquid resource passes through a column containing these resins, lithium ions are captured and held by the resin while other ions are allowed to pass through. Once the resin is saturated with lithium, it can be regenerated using an appropriate eluent, resulting in a concentrated lithium solution. Non-limiting examples of resins used in this context include strong-acid cation-exchange resins or chelating resins designed specifically for lithium recovery.

Membrane-based systems 568, such as those utilizing nanofiltration, ultrafiltration, or reverse osmosis 550, can also be employed to concentrate lithium from the pre-treated midstream-liquid resource. In these systems, the liquid resource is passed through a lithium-selective membrane that allows lithium ions to permeate while rejecting larger ions and molecules. This results in a concentrated lithium solution on one side of the membrane. Non-limiting examples of membranes include polymeric or Divalent Rejection Membranes with pore sizes and surface charges tailored to enhance or optimize lithium-ion selectivity and passage.

In some embodiments, the extracted lithium then can be further processed and concentrated in the metal product retention system 560, providing a versatile and adaptable solution for lithium extraction from a variety of midstream-liquid resources.

Metal Product Retention Station

Once the desorption regimen has been completed, the metal-rich product in solution, or retentate, may be concentrated and collected in a metal-product retention system 560. In some embodiments, the metal-product retention system 560 may be adapted to house and potentially further concentrate the desired metal in solution by incorporating various features and mechanisms designed for this purpose. For illustrative purposes, the system may include a reservoir equipped with agitation systems that maintain uniformity in the metal-rich solution, thereby preventing the settling of solids. Non-limiting examples of concentration mechanisms that could be included in the metal-product retention system 570 are evaporation systems, which could employ controlled heating or vacuum-assisted evaporation to reduce the solution volume, thereby increasing the concentration of the metal.

In some embodiments, the metal-product retention system 570 may include membrane-filtration techniques, such as ultrafiltration or reverse osmosis, to selectively remove water and other impurities, further concentrating the metal ions in the solution. Crystallization may also be utilized, wherein the system could be equipped with a crystallizer that induces supersaturation in the metal-rich solution, leading to the precipitation of the metal as a solid, which can then be collected separately. In some embodiments, evaporation techniques may be applied to the metal-rich product in solution, or retentate, in order to increase the metal concentration. In some embodiments, the metal-product retention system 570 may include a reverse-osmosis station 550. The reverse-osmosis station 550 may receive the metal-rich product in solution and remove water from the solution, thereby increasing the concentration of the desired metal within the metal-rich product in solution. This step ensures that the final metal-rich product meets the required purity and concentration levels for commercial applications. In some embodiments, the metal-rich product in solution may be cycled multiple times to concentrate the metal content. For illustrative purposes, concentrating an initial desired metal concentration of the metal eluate to a desired metal-cycle concentration between one hundred to five hundred (100-500) ppm per cycle may be performed, thereby forming a further concentrated metal-rich product in solution.

For further system 560 enhancement or optimization, the metal-product retention system 570 may be adapted with automated monitoring and control features that adjust process parameters such as temperature, pressure, and pH to ensure enhanced or optimal metal recovery and concentration. For example, pH adjustment features and redox-potential control systems may be included to maintain the metal in a soluble form or to facilitate its precipitation. Non-limiting examples of these controls might involve adding specific acids or bases to maintain solubility or initiate controlled crystallization.

In some embodiments, to ensure safety and stability, particularly when handling reactive or toxic metal solutions, the metal-product retention system 570 may include features such as inert-gas blanketing (e.g., nitrogen) to prevent oxidation or undesired reactions with atmospheric gases. Additionally, the system could be constructed from corrosion-resistant materials to ensure longevity and safety during operation. These features are provided for illustrative purposes and are not intended to be limiting, as other configurations and adaptations may also be employed within the scope of the disclosure.

The foregoing disclosure provides illustration and description but is not intended to be exhaustive or to limit the implementations to the precise form disclosed. Modifications may be made in light of the above disclosure or may be acquired from practice of the implementations. As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein. As used herein, satisfying a threshold may, depending on the context, refer to a value being greater than the threshold, greater than or equal to the threshold, less than the threshold, less than or equal to the threshold, equal to the threshold, and/or the like, depending on the context. Although particular combinations of features are recited in the claims and/or disclosed in the specification, these combinations are not intended to limit the disclosure of various implementations. In fact, many of these features may be combined in ways not specifically recited in the claims and/or disclosed in the specification.

Although each dependent claim listed below may directly depend on only one claim, the disclosure of various implementations includes each dependent claim in combination with every other claim in the claim set. No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for enhancing critical-material extraction of a critical-material, the method comprising:
   a. receiving a volume of a midstream-liquid resource from a pipeline, tank, or disposal site;
   b. pre-treating the volume of the midstream-liquid resource wherein the pre-treating comprises applying a biocide to the volume of the midstream-liquid resource thereby resulting in a pre treated fluid;
   c. applying a treatment regimen to the pre-treated fluid, wherein applying the treatment regimen comprises removing hydrocarbons, organic matter, hydrogen sulfide, ions, or suspended solids from the pre-treated fluid, thereby resulting in a treated fluid; and
   performing critical-material extraction on the treated fluid.

2. The method of claim 1, wherein applying the biocide to the volume of the midstream-liquid resource further comprises applying at least one of:
   a. an oxidizer;
   b. glutaraldehyde;
   c. Quaternary Ammonium Compounds (QUATs);
   d. DBNPA (2,2-Dibromo-3-nitrilopropionamide); or
   e. THPS (Tetrakis(hydroxymethyl)phosphonium sulfate).

3. The method of claim 2, wherein applying an oxidizer comprises applying at least one of hydrogen peroxide, ozone, bubbled oxygen, nanobubbled oxygen, carbon dioxide ($CO_2$), aeration, chlorine, chlorine dioxide, sodium hypochlorite, peracetic acid, potassium permanganate, or calcium hypochlorite to the volume of the midstream-liquid resource.

4. The method of claim 1, wherein applying a treatment regimen to the pre-treated fluid further comprises at least one of:
   a. applying, to the pre-treated fluid, at least one of media filtration, cartridge filters, bag filters, disc filters, membrane filtration, activated carbon, dissolved-air flotation (DAF), suspended-air flotation (SAF), or a weir tank, and wherein removing hydrocarbons, organic matter, ions, or suspended solids further comprises applying at least one of a polyacrylamide (PAM), polyethyleneimine, polyamines, polyDADMAC (polydiallyldimethylammonium chloride), starch-based flocculants, chitosan, or another organic or inorganic flocculants; or
   b. removing from the pre-treated fluid, precipitated emulsified or flocculated solids using media filtration, weir pond, cartridge filters, bag filters, disc filters, membrane filtration, activated carbon, dissolved-air flotation (DAF), suspended-air flotation (SAF), a weir tank, or a settling tank.

5. The method of claim 1, wherein pre-treating the volume of the midstream-liquid resource further comprises separating the volume of the midstream-liquid resource into a retentate and a filtrate having a turbidity of less than 20 Nephelometric Turbidity Units (NTU), Total Suspended Solids (TSS) of less than 200 mg/L, a positive Oxidation-Reduction Potential (ORP), and an iron content of less than 5 mg/L.

6. The method of claim 1, wherein pre-treating the volume of the midstream-liquid resource further comprises:
   a. altering at least one of a cationic constituency or an anionic constituency of the volume of the midstream-liquid resource by subjecting the volume of the midstream-liquid resource to at least one of media-bed filtration, an ion-exchange process, ceramic filtration, or polymeric-membrane filtration; or
   b. creating, from the volume of the midstream-liquid resource, a retentate through a desalination process wherein the retentate is concentrated to a higher level of Total Dissolved Solids (TDS) utilizing a membrane or thermal evaporation.

7. The method of claim 1, wherein applying the treatment regimen to the pre-treated fluid comprises applying, to the pre-treated fluid, at least one of:
   a. a biocide, wherein the biocide is at least one of a hydrogen peroxide, ozone, bubbled oxygen, nanobubbled oxygen, carbon dioxide ($CO_2$), aeration, chlorine, chlorine dioxide, sodium hypochlorite, peracetic acid, potassium permanganate, calcium hypochlorite, glutaraldehyde, Quaternary Ammonium Compounds (QUATs), DBNPA (2,2-Dibromo-3-nitrilopropionamide), or THPS (Tetrakis Hydroxymethyl Phosphonium Sulfate);
   b. a flocculant, wherein the flocculant is at least one of a polyacrylamide, polyethyleneimine, Polyacrylamide (PAM), Polyamines, PolyDADMAC (Polydiallyldimethylammonium chloride), Starch-based flocculants, or Chitosan;
   c. a coagulatant, wherein the coagulant is at least one of a polyaluminum chloride, aluminochlorohydrate, Polyaluminum Chloride (PAC), Aluminochlorohydrate, Aluminum Sulfate (Alum), Ferric Chloride, Ferric Sulfate, Ferrous Sulfate, Sodium Aluminate, or Calcium Hydroxide (Lime);
   d. a surfactant wherein the surfactant is at least one of polyethylene glycols (PEGs), alcohol ethoxylates, linear alkyl ethoxylates (LAEs), sodium dodecyl sulfate (SDS), sodium lauryl sulfate (SLS), octylphenol ethoxylates (OPEOs), nonylphenol ethoxylates (NPEOs), alkyl polyglycosides (APGs), cocamidopropyl betaine, saponins, glycolipids, or rhamnolipids; or
   e. a natural or synthetic ion-exchange media wherein the ion-exchange media is at least one of zeolite, manganese greensand, synthetic resins, natural clay minerals, functionalized silica, or carbon-based ion exchangers.

8. The method of claim 1, wherein applying a treatment regimen to the pre-treated fluid further comprises removing from the pre-treated fluid, one or more of remaining hydrocarbons, treatment chemicals from one or more prior treatment steps, organics, hydrogen sulfide, suspended solids down to one (1) micron, additional flocculant solids down to one (1) micron, cationic content, or anionic content.

9. The method of claim 1, wherein removing hydrocarbons, organic matter, ions, or suspended solids further comprises removing, from the pre-treated fluid, suspended or flocculated particles using at least one of a dissolved-air flotation (DAF), a suspended-air flotation (SAF), a weir tank, media bed, membrane, centrifuge, clarifier, or a hydrocyclone.

10. The method of claim 1, wherein performing critical-material extraction on the treated fluid further comprises performing on the treated fluid, at least one of ion exchange, adsorption, membrane-based separation, solvent extraction, electrochemical extraction, selective precipitation, or a hybrid process combining two or more of the aforementioned processes.

11. The method of claim 1, wherein performing critical-material extraction on the treated fluid further comprises:
   a. exposing the treated fluid to a sorbent composition for a contact time, wherein the sorbent composition is one or more of a lithium manganese oxide (LMO), a lithium manganese oxide (LMO)-type lithium ion-sieve (LIS), a titanate sorbent, or an aluminate sorbent;
   b. removing a liquid from the sorbent composition after the contact time elapses thereby resulting in a sorbent; and
   c. rinsing the sorbent with a reagent to produce at least one lithium eluate, wherein rinsing the sorbent further comprises concentrating an initial lithium concentration of the at least one lithium eluate to a lithium-cycle concentration between one hundred to five hundred (100-500) ppm per cycle, thereby forming a lithium product in solution.

12. The method of claim 1 wherein performing critical-material extraction on the treated fluid comprises performing Direct Lithium Extraction on the treated fluid.

* * * * *